United States Patent
Ikeda et al.

(10) Patent No.: US 7,317,067 B2
(45) Date of Patent: Jan. 8, 2008

(54) POLYCARBONATE COPOLYMER, AND HEAT RESISTANT PARTS COMPRISING THE SAME

(75) Inventors: Koki Ikeda, Chiyoda-ku (JP); Toshimasa Tokuda, Chiyoda-ku (JP); Yoshimasa Okamoto, Chiyoda-ku (JP); Masato Ando, Chiyoda-ku (JP)

(73) Assignee: Teijin Chemicals, Tokyo (JP)

( * ) Notice: Subject to any disclaimer, the term of this patent is extended or adjusted under 35 U.S.C. 154(b) by 0 days.

(21) Appl. No.: 10/509,222

(22) PCT Filed: Mar. 24, 2003

(86) PCT No.: PCT/JP03/03525

§ 371 (c)(1), (2), (4) Date: Nov. 9, 2004

(87) PCT Pub. No.: WO03/082951

PCT Pub. Date: Oct. 9, 2003

(65) Prior Publication Data

US 2005/0119441 A1    Jun. 2, 2005

(30) Foreign Application Priority Data

Mar. 28, 2002 (JP) ............ 2002-090888
May 14, 2002 (JP) ............ 2002-138144
Jul. 26, 2002 (JP) ............ 2002-217994
Aug. 26, 2002 (JP) ............ 2002-244990

(51) Int. Cl.
C08G 64/00 (2006.01)

(52) U.S. Cl. ............ 528/196; 524/147; 524/302; 524/323; 528/198; 528/202; 528/204

(58) Field of Classification Search .......... 524/147, 524/302, 323; 528/196, 198, 202, 204
See application file for complete search history.

(56) References Cited

U.S. PATENT DOCUMENTS

| | | | | |
|---|---|---|---|---|
| 5,303,824 A * | 4/1994 | Kohn | | 206/449 |
| 5,409,975 A * | 4/1995 | Nishiguichi et al. | | 524/147 |
| 6,316,576 B1* | 11/2001 | Fujimori et al. | | 528/196 |
| 6,340,737 B2* | 1/2002 | Ogawa et al. | | 528/196 |
| 6,780,490 B1 | 8/2004 | Tanaka et al. | | |
| 2003/0055210 A1* | 3/2003 | Sawada et al. | | 528/310 |

FOREIGN PATENT DOCUMENTS

| | | |
|---|---|---|
| EP | 0 722 099 | 7/1996 |
| EP | 1 045 261 A1 | 10/2000 |
| EP | 1 195 758 A1 | 4/2002 |
| EP | 1 518 880 | 3/2005 |
| JP | 2-304741 | 12/1990 |
| JP | 06-025398 | 2/1994 |
| JP | 6-192411 | 7/1994 |
| JP | 06-192411 | 7/1994 |
| JP | 07-268197 | 10/1995 |
| JP | 11-035815 | 2/1999 |
| JP | 11-306823 | 11/1999 |
| JP | 2000-319375 | 11/2000 |
| JP | 2000-319376 | 11/2000 |
| JP | 2000-319377 | 11/2000 |
| JP | 2000-327767 | 11/2000 |
| JP | 2001-55436 | * 2/2001 |
| JP | 2001-055436 | 2/2001 |
| WO | 01-73780 A1 | 10/2001 |

* cited by examiner

Primary Examiner—Terressa Boykin
(74) Attorney, Agent, or Firm—Wenderoth, Lind & Ponack, L.L.P.

(57) ABSTRACT

An object of the present invention is to provide a polycarbonate copolymer having excellent heat resistance and dimensional stability and heat resistant parts comprising the copolymer and suitable for use in various applications. The present invention is a polycarbonate copolymer comprising 5 to 95 mol % of recurring unit (component a) represented by the following general formula (I):

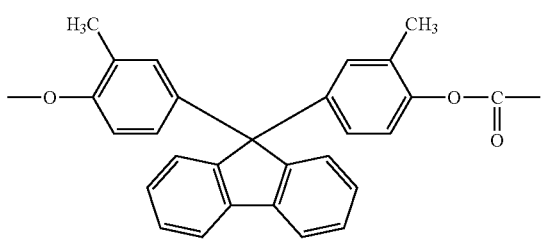

and 95 to 5 mol % of recurring unit (component b) represented by the following general formula (II):

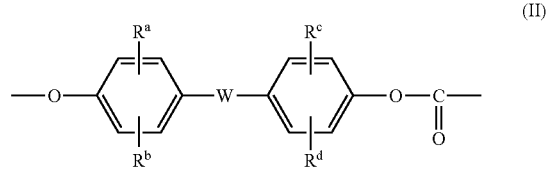

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, SO, $SO_2$, CO or COO group), and various heat resistant parts comprising the copolymer.

33 Claims, 1 Drawing Sheet

POLYCARBONATE COPOLYMER, AND HEAT RESISTANT PARTS COMPRISING THE SAME

TECHNICAL FIELD

The present invention relates to a polycarbonate copolymer and heat resistant parts comprising the copolymer. More specifically, the present invention relates to a polycarbonate copolymer having recurring units comprising 9,9-bis(4-hydroxy-3-methylphenyl)fluorene, and heat resistant parts comprising the copolymer. Further, the present invention also relates to a resin composition comprising the copolymer.

BACKGROUND ART

A polycarbonate obtained by reacting 2,2-bis(4-hydroxyphenyl)propane (hereinafter maybe referred to as "bisphenol A") with a carbonate precursor is used as engineering plastic in a wide variety of fields. However, molded articles using the polycarbonate comprising bisphenol A show unsatisfactory heat resistance, transparency, moldability and dimensional stability depending on applications, so that the molded articles may undergo distortion, fusion or the like.

Hence, a variety of proposals have been made so as to improve heat resistance (refer to Patent Publications 1, 2, 3, 4, 5 and 6).

Further, as an optical application, a polycarbonate copolymer having a fluorene structure as typified by 9,9-bis(4-hydroxyphenyl)fluorene has been proposed (refer to Patent Publications 7, 8, 9, 10, 11, 12 and 13).

(Publications on Prior Arts)

| | |
|---|---|
| Patent Publication 1 | JP-A 6-25401 |
| Patent Publication 2 | JP-A 7-52270 |
| Patent Publication 3 | JP-A 6-192411 |
| Patent Publication 4 | JP-A 11-306823 |
| Patent Publication 5 | JP-A 11-35815 |
| Patent Publication 6 | JP-A 7-268197 |
| Patent Publication 7 | JP-A 6-25398 |
| Patent Publication 8 | JP-A 6-172508 |
| Patent Publication 9 | JP-A 2000-319375 |
| Patent Publication 10 | JP-A 2000-319376 |
| Patent Publication 11 | JP-A 2000-319377 |
| Patent Publication 12 | JP-A 2001-55435 |
| Patent Publication 13 | JP-A 2001-55436 |

(Problems to be Solved by the Invention)

An object of the present invention is to provide a polycarbonate copolymer having excellent heat resistance and dimensional stability, a resin composition comprising the copolymer, and a variety of molded articles.

DISCLOSURE OF THE INVENTION

The present invention is a polycarbonate copolymer comprising 5 to 95 mol % of recurring unit (component a) represented by the following general formula (I):

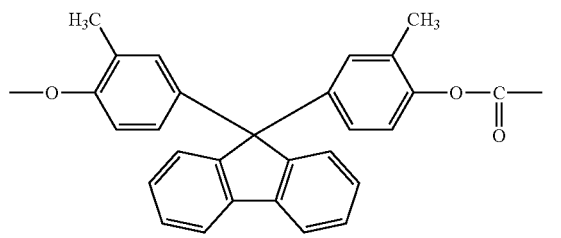

and 95 to 5 mol % of recurring unit (component b) represented by the following general formula (II):

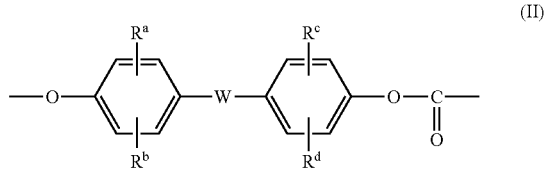

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, $SO_2$, CO or COO group).

Further, the present invention is a heat resistant part comprising a polycarbonate copolymer, the polycarbonate copolymer comprising 5 to 95 mol % of recurring unit (component a) represented by the following general formula (I):

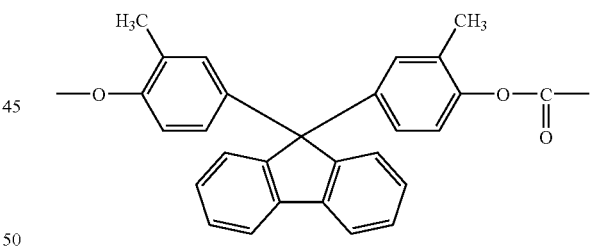

and 95 to 5 mol % of recurring unit (component b) represented by the following general formula (II):

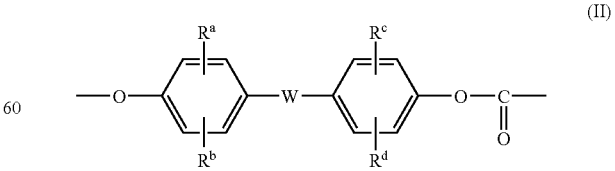

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, SO$_2$, CO or COO group).

A first aspect of the present invention is a part for reflow soldering comprising a polycarbonate copolymer, the polycarbonate copolymer comprising 60 to 95 mol % of recurring unit (component a) represented by the following general formula (I):

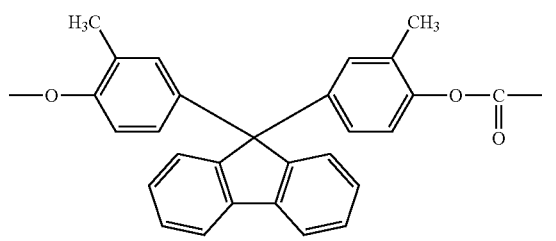

and 40 to 5 mol % of recurring unit (component b) represented by the following general formula (II-1).

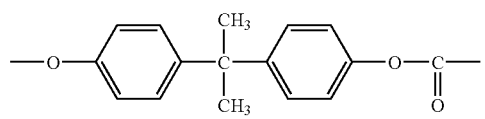

A second aspect of the present invention is a light path converting part comprising a polycarbonate copolymer, the polycarbonate copolymer comprising 50 to 95 mol % of recurring unit (component a) represented by the following general formula (I):

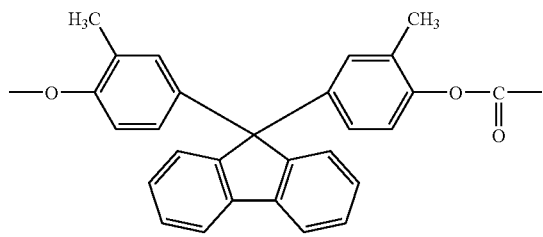

and 50 to 5 mol % of recurring unit (component b) represented by the following general formula (II):

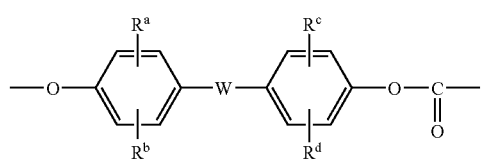

(wherein R$^a$ to R$^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, SO$_2$, CO or COO group).

A third aspect of the present invention is an optical disk that comprises a substrate with a thickness of 0.3 to 1.2 mm which has embossed pits or guide grooves, a reflective layer formed on the substrate and a transparent protective layer with a thickness of 3 to 200 µm which is formed on the reflective layer and that reproduces recorded data based on a change in the light intensity of reflected light produced by irradiating the disk with a light beam from the transparent protective layer side, the substrate substantially comprising a polycarbonate copolymer, the polycarbonate copolymer comprising 20 to 95 mol % of recurring unit (component a) represented by the following general formula (I):

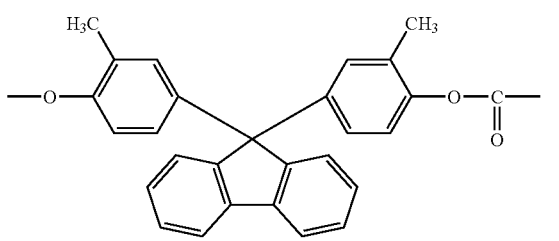

and 80 to 5 mol % of recurring unit (component b) represented by the following general formula (II):

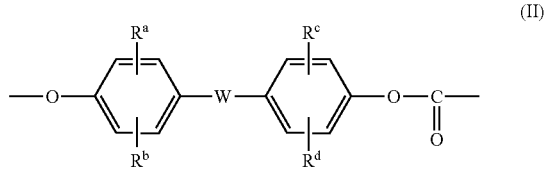

(wherein R$^a$ to R$^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, SO$_2$, CO or COO group), the substrate showing:

(A) a flexural modulus of 2,800 to 4,000 MPa,
(B) a water absorption of 0.3 wt % or lower upon reaching saturation,
(C) a tan δ measured at 40° C. and 18 Hz in accordance with ISO 6721-4 of at least 0.020, and
(D) a deflection temperature under load measured under a load of 1.81 MPa in accordance with ISO 75-1, -2 of 110° C. or higher.

A fourth aspect of the present invention is a plastic mirror comprising a polycarbonate substrate and a metallic reflective film, the polycarbonate substrate comprising a polycarbonate copolymer, the polycarbonate copolymer comprising 20 to 70 mol % of recurring unit (component a) represented by the following general formula (I):

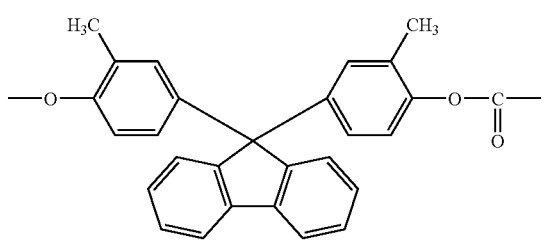
(I)

and 80 to 30 mol % of recurring unit (component b) represented by the following general formula (II-1) and/or (II-2):

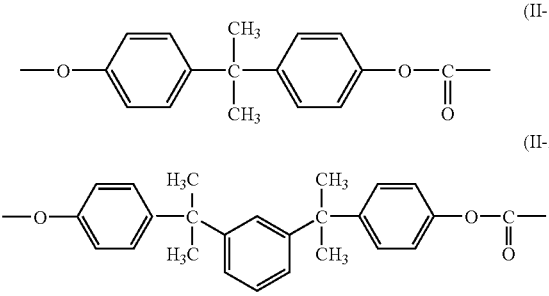
(II-1)
(II-2)

the polycarbonate substrate showing:
(A) a glass transition temperature of 120 to 230° C.,
(B) a water absorption of 0.2 wt % or lower after immersed in water at 23° C. for 24 hours, and
(C) a flexural modulus of 2,500 to 4,000 MPa.

A fifth aspect of the present invention is a conductive resin composition comprising a polycarbonate copolymer and a carbon based filler, the polycarbonate copolymer comprising 5 to 95 mol % of recurring unit (component a) represented by the following general formula (I):

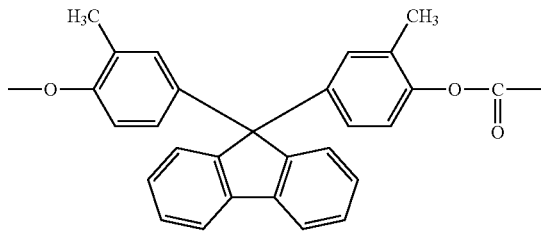
(I)

and 95 to 5 mol % of recurring unit (component b) represented by the following general formula (II):

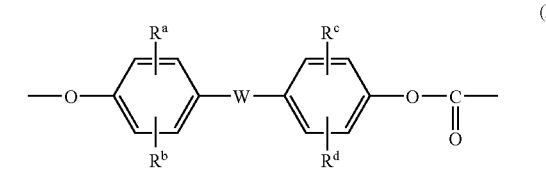
(II)

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, $SO_2$, CO or COO group).

The fifth aspect includes a tray for conveying an electronic part, the tray comprising a polycarbonate copolymer and a carbon based filler, the polycarbonate copolymer comprising 5 to 95 mol % of recurring unit (component a) represented by the following general formula (I):

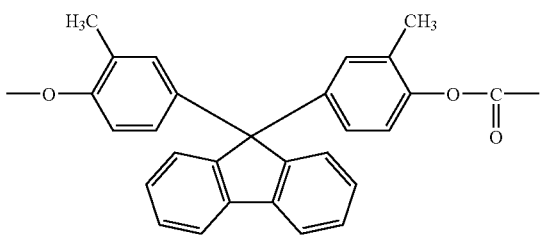
(I)

and 95 to 5 mol % of recurring unit (component b) represented by the following general formula (II):

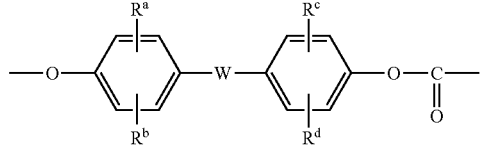
(II)

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, $SO_2$, CO or COO group).

BEST MODE FOR CARRYING OUT THE INVENTION

Polycarbonate Copolymer (Component a)

Figure 1:
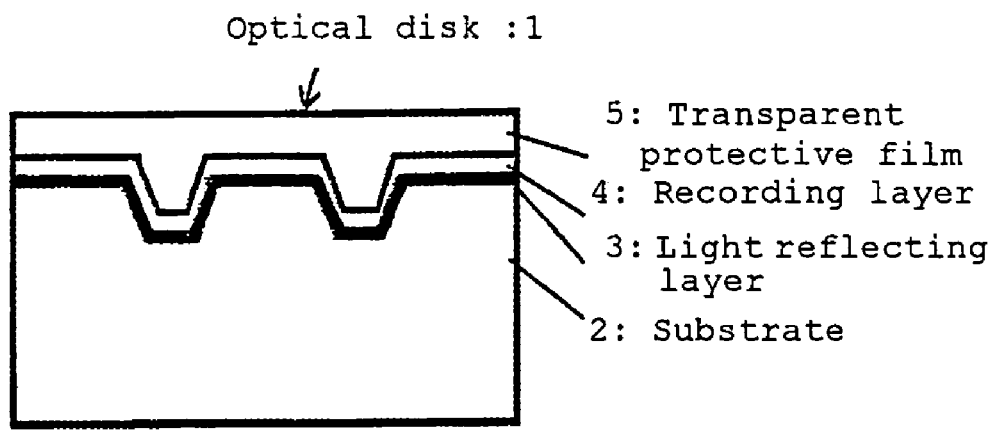
FIG. 1 is a partial schematic view of a vertical cross section of a disk in one embodiment of an optical disk of the present invention.

The polycarbonate copolymer of the present invention is produced by using, as an aromatic dihydroxy component, 9,9-bis(4-hydroxy-3-methylphenyl)fluorene (hereinafter may be abbreviated as "biscresolfluorene") represented by the following formula (1).

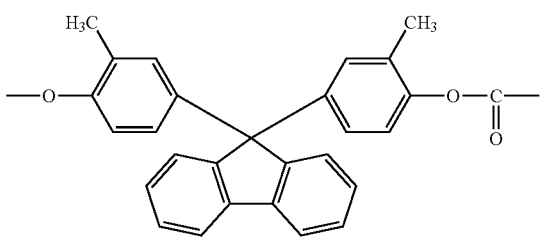
(I)

(Component b)

The polycarbonate copolymer of the present invention is produced by using, as a copolymerizable component, an aromatic dihydroxy component represented by the following formula (2):

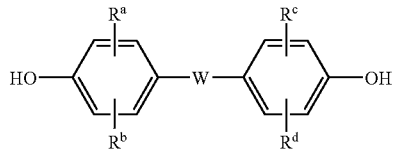
(2)

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, $SO_2$, CO or COO group).

As such an aromatic dihydroxy component, any component which is generally used as a dihydroxy component of a polycarbonate may be used. Illustrative examples of the component include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane ("bisphenol A"), 2,2-bis(4-hydroxy-3-methylphenyl)propane ("bisphenol C"), 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 1,1-bis(4-hydroxyphenyl)cyclohexane ("bisphenol Z"), 1,1-bis(4-hydroxyphenyl)cyclopentane, 4,4'-dihydroxydiphenyl ether, 4,4'-dihydroxy-3,3'-dimethyldiphenyl ether, 4,4'-dihydroxydiphenyl sulfone, 4,4'-dihydroxydiphenyl sulfoxide, 4,4'-dihydroxydiphenyl sulfide, 4,4'-dihydroxy-3,3'-dimethyldiphenyl sulfone, 4,4'-dihydroxy-3,3'-dimethyldiphenyl sulfide, 4,4'-dihydroxy-3,3'-dimethyldiphenyl sulfoxide, 4,4'-dihydroxy-3,3'-diphenyldiphenyl sulfone, 4,4'-dihydroxy-3,3'-diphenyldiphenyl sulfide, 4,4'-dihydroxy-3,3'-diphenyldiphenyl sulfoxide, 1,3-bis{2-(4-hydroxyphenyl)propyl}benzene ("bisphenol M") and 1,4-bis{2-(4-hydroxyphenyl)propyl}benzene.

Of these, 2,2-bis(4-hydroxyphenyl)propane ("bisphenol A") represented by the following formula (2-1), 1,3-bis{2-(4-hydroxyphenyl)propyl}benzene ("bisphenol M") represented by the following formula (2-2) and 2,2-bis(4-hydroxy-3-methylphenyl)propane ("bisphenol C") represented by the following formula (2-3) are suitable.

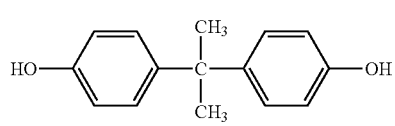
(2-1)

-continued

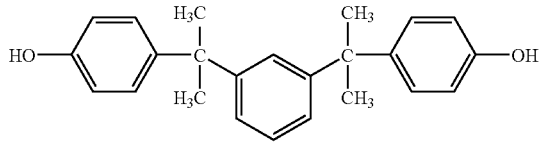
(2-2)

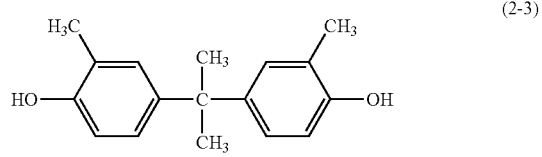
(2-3)

(Other Copolymerizable Components)

Further, the polycarbonate copolymer of the present invention may be a branched polycarbonate copolymer copolymerized with a phenolic compound having three or more functional groups.

Illustrative examples of the phenolic compound having three or more functional groups include phloroglucin, phloroglucide, 4,6-dimethyl-2,4,6-tris(4-hydroxyphenyl)heptene-2,4,6-dimethyl-2,4,6-tris-(4-hydroxyphenyl)heptane, 1,3,5-tris(4-hydroxyphenyl)benzene, 1,1,1-tris(4-hydroxyphenyl)ethane, 2,2-bis(4,4-bis(4-hydroxyphenyl)cyclohexyl)propane, 2,6-bis(2-hydroxy-5-methylbenzyl)-4-methyl phenol, 2,6-bis(2-hydroxy-5-isopropylbenzyl)-4-isopropyl phenol, bis(2-hydroxy-3-(2-hydroxy-5-methylbenzyl)-5-methylphenyl)methane, tetrakis(4-hydroxyphenyl)methane, tris(4-hydroxyphenyl)phenyl methane, trisphenol, 2,2-bis(2,4-hydroxyphenyl)propane, bis(2,4-dihydroxyphenyl)ketone, and 1,4-bis(4,4-dihydroxytriphenylmethyl)benzene. Of these, 1,1,1-tris(4-hydroxyphenyl)ethane is preferred. These may be used alone or in combination of two or more. The phenolic compound having three or more functional groups is preferably used in an amount of 0.01 to 5 mol %, more preferably 0.1 to 3 mol %, based on all aromatic dihydroxy components, and a branched polycarbonate copolymer having excellent rigidity is obtained.

The present invention includes heat resistant parts comprising the above copolymer. Illustrative examples of the heat resistant parts include parts for reflow soldering, light path converting parts, optical disks, plastic mirrors, and trays for conveying electronic parts.

<First Aspect: Parts for Reflow Soldering>

A first aspect of the present invention relates to a part for reflow soldering with good transparency which does not undergo deformation during soldering in a reflow furnace.

In the field of electronic parts, along with a recent reduction in the size and improvement in the performance of electrical appliances and for the purpose of improving productivity, a surface mount technology (SMT) which achieves a high part mounting density and has good efficiency has been becoming popular as a method of mounting various electronic parts on substrates.

The surface mounting technology refers to a technology for securing electronic parts on a printed circuit board by placing the electronic parts on the wiring board via creamy solder and then passing the circuit board through a heating furnace (reflow furnace) so as to melt the solder.

Illustrative examples of methods which are primarily employed as a method for heating the substrate in the reflow furnace include a hot air convention heat transfer method comprising passing the board through hot air which is forcibly circulated, a far-infrared method comprising heating the board by a far-infrared radiation from above the board or from both above and below the board, and a method comprising heating the board by using hot air and a far-infrared radiation in combination. In soldering, the circuit board and electronic parts introduced into the reflow furnace reaches high temperatures of 220 to 270° C.

Among electronic parts, there are parts which must have transparency such as lenses, prisms and transparent covers. Although these parts are currently made of glass or a thermosetting resin in consideration of a problem of heat resistance, there is a problem that it takes time to mold them. Accordingly, thermoplastic resins having heat resistance against reflow and easy moldability are desired. However, those having balanced reflow heat resistance and optical properties are not yet known.

An object of the first aspect of the present invention is to provide a part for reflow soldering with heat resistance against reflow soldering and excellent transparency and moldability.

(Polycarbonate Copolymer)

A polycarbonate copolymer constituting the part for reflow soldering of the first aspect of the present invention comprises a recurring unit (component a) represented by a general formula (I) in an amount of 60 to 95 mol %, preferably 65 to 90 mol %, more preferably 70 to 85 mol %, and a recurring unit (component b) represented by a general formula (II-1) in an amount of 40 to 5 mol %, preferably 35 to 10 mol %, more preferably 30 to 15 mol %.

When the component a is smaller than 60 mol %, its heat resistance as a part for reflow soldering may be poor. Meanwhile, when the component a is larger than 95 mol %, the copolymer shows poor melt flowability and is difficult to mold, and an article molded therefrom shows poor transparency.

(Specific Viscosity)

The polycarbonate copolymer preferably shows a specific viscosity of 0.17 to 0.55, more preferably 0.21 to 0.45, which is measured at 20° C., dissolving 0.7 g of the copolymer in 100 ml of methylene chloride.

(Glass Transition Temperature)

The polycarbonate copolymer preferably shows a glass transition temperature (Tg) of 200 to 250° C. which is measured at a temperature increasing rate of 20° C./min. The Tg is more preferably 205 to 245° C. When the Tg is lower than 200° C., the reflow heat resistance of an optical part formed by use of the copolymer is not satisfactory, while when it is higher than 250° C., the copolymer has high melt viscosity and may be difficult to handle in some cases.

(Melt Volume Rate)

The polycarbonate copolymer preferably shows a melt volume rate (MVR) measured at 320° C. under a load of 1.2 kg in accordance with JIS K-7210 of at least 0.2 $cm^3$/10 min, more preferably 0.5 $cm^3$/10 min.

Specific examples of the parts for reflow soldering of the present invention include lenses and covers for various indicator lamps; camera lenses and lens barrels for camera-incorporated mobile telephones; lenses and covers for light emitting elements such as diodes; covers and sealants for various devices such as transistors and rectifiers; covers and sealants for sensors, ICs (integrated circuits) and the like; and spectral separation/integration devices such as optical guides and optical fiber cables, e.g., prisms. The parts for reflow soldering of the present invention are particularly suitable for lenses, lens barrels and prisms.

The parts for reflow soldering are molded by any method such as an injection molding method, a compression molding method, an injection compression molding method, an extrusion method and a solution casting method.

Optical parts require transparency for different wavelengths according to applications. For example, covers and sealants require transparency for visible light (400 to 700 nm). Lenses and covers for light emitting elements such as diodes require transparency for the wavelengths of light emitted from the elements. Further, for optical fiber communication, wavelengths of 1,300 to 1,600 nm are used, and spectral separation devices such as prisms for spectral separation of an optical fiber cable require transparency for the wavelengths.

The polycarbonate copolymer used in the present invention shows good transparency at any of these wavelengths. A test piece with a thickness of 1.0 mm which is formed from the polycarbonate copolymer preferably has a transmittance of 60% or higher, more preferably 70% or higher, at each of the following wavelengths, i.e., 400 nm, 500 nm, 600 nm, 700 nm, 1,300 nm, 1,400 nm, 1,500 nm and 1,600 nm.

The part for reflow soldering of the present invention is not deformed even after treated in a reflow furnace preset such that a peak temperature of 250° C. lasts for 5 seconds.

<Second Aspect: Light Path Converting Part>

A second aspect of the present invention relates to a light path converting part having good heat resistance and thermal stability, a very little birefringence and excellent transparency.

Heretofore, a number of polymethyl methacrylate resins have been used as optical materials such as lenses, light guide plates and the like since they have good transparency and low birefringence. However, while demand for an improvement in the heat resistance of resins has been increasing in recent years from the viewpoints of an increase in the density of electronic equipment and safety, it is hard to say that the polymethyl methacrylate resin has sufficient heat resistance.

Meanwhile, polycarbonate resins are used in various applications including optical materials due to high transparency and dimensional stability. However, in view of properties required in optical members requiring optical accuracy such as lenses, prisms, light guide plates and light guides, since the polycarbonate resins belong to a group of common plastics which show very distinct birefringence caused by orientation of a molecular chain and show a significant distortion caused by molding, it is currently difficult to develop use of the resins to optical elements.

As a method of improving the birefringence of the polycarbonate resin, a method of graft copolymerizing the polycarbonate resin with a styrene based resin is proposed (JP-A 61-19630 and 63-15822). However, the graft copolymer comprising the polycarbonate resin and the styrene based resin has low mechanical strength, is very brittle and is difficult to mold due to poor thermal stability, and in order to improve the mechanical strength, its molecular weight must be made high. However, along with an increase in the molecular weight, its moldability and surface precision deteriorate, so that a practical lens cannot be obtained.

As an improved method free of the above problem of the above method, a method of mixing a polycarbonate resin comprising an aromatic dihydroxy component such as bis (4-hydroxy-3,5-dimethylphenyl)propane with an acrylonitrile-styrene copolymer is proposed (JP-A 5-027101). However, although this resin composition has improved transparency and birefringence, it has a problem that it has low thermal stability and is very difficult to mold.

Further, a lens with improved heat resistance and a high refractive index which comprises a polycarbonate copolymer containing an aromatic dihydroxy component having a fluorene skeleton introduced therein is reported (JP-A 6-018701). However, this publication describes improvements of heat resistance and a refractive index but does not mention a specific improvement in birefringence.

An object of the second aspect of the present invention is to provide an optical molded article having a very little birefringence and excellent transparency.

The present inventor has found that a polycarbonate copolymer obtained by using a specific dihydric phenol in a specific amount has a very little birefringence and that an article molded from the polycarbonate copolymer has suitable optical properties.

(Polycarbonate Copolymer)

A polycarbonate copolymer constituting the light path converting part of the second aspect of the present invention comprises a recurring unit (component a) represented by a general formula (I) in an amount of 50 to 95 mol %, preferably 65 to 75 mol %, and a recurring unit (component b) represented by a general formula (II) in an amount of 50 to 5 mol %, preferably 35 to 25 mol %.

Particularly, a polycarbonate copolymer comprising a recurring unit (component a) represented by a general formula (I) in an amount of 50 to 95 mol % and a recurring unit (component b) represented by a general formula (II-1) and/or (II-2) in an amount of 50 to 5 mol % is preferred.

($Re_{550}$)

The polycarbonate copolymer preferably shows a transmittance at 550 nm of 80% or higher as a molded plate and preferably satisfies the following expression:

$$Re_{550}/d \leq 10$$

when retardation at 550 nm is $Re_{550}$ (nm) and the thickness of a portion where the transmittance and the retardation are measured is d (mm).

An optical element comprising a general bisphenol A type polycarbonate resin generally shows high retardation, and its value can be reduced by molding conditions in some cases. However, the range of the conditions is generally very small, so that molding becomes very difficult to carry out and the general polycarbonate resin often fails to satisfy the expression. Meanwhile, the polycarbonate copolymer used in the present invention shows low retardation caused by orientation of the resin and a small distortion caused by molding, so that a good optical element can be obtained therefrom without strict setting of molding conditions.

(Transmittance)

The molded plate preferably has a transmittance ($T_{550}$) at 550 nm of 80% or higher, more preferably 85% or higher. The transmittance is measured by use of the U-4001 type spectrophotometer of Hitachi, Ltd.

(Specific Viscosity)

The polycarbonate copolymer preferably shows a specific viscosity of 0.17 to 0.55, more preferably 0.21 to 0.45, which is measured at 20° C. after 0.7 g of the polymer is dissolved in 100 ml of methylene chloride.

(Glass Transition Temperature)

The polycarbonate copolymer preferably shows a glass transition temperature (Tg) of 150 to 250° C. which is measured at a temperature increasing rate of 20° C./min. The Tg is more preferably 160 to 245° C.

(5% Weight Reduction Temperature)

The polycarbonate copolymer preferably shows a 5% weight reduction temperature (Td) of 450° C. or higher, more preferably 480° C. or higher, as an indication of thermal stability, which is measured at a temperature increasing rate of 20° C./min. When the 5% weight reduction temperature is lower than 450° C., thermal decomposition during molding is intense, and it therefore becomes difficult to obtain a good molded article disadvantageously.

(Photoelastic Coefficient)

The polycarbonate copolymer preferably has a photoelastic coefficient of $50 \times 10^{13}$ $cm^2$/dyne or lower, more preferably $45 \times 10^{13}$ $cm^2$/dyne or lower. When the photoelastic coefficient is higher than $50 \times 10^{13}$ $cm^2$/dyne, a distortion caused by molding is large, and it may be therefore difficult to use the resulting molded article as a light path converting part in some cases.

(Melt Volume Rate)

The polycarbonate copolymer preferably shows a melt volume rate (MVR) measured at 340° C. under a load of 1.2 kg in accordance with JIS K-7210 of at least 1.0 $cm^3$/10 min, more preferably at least 1.5 $cm^3$/10 min.

The light path converting part refers to a lens, prism, light guide plates and light guide which are optical elements used as parts for optical equipment. More specifically, the lens refers to any lenses which have two spherical or non-spherical refractive surfaces and allow light to pass therethrough. Illustrative examples of the lens include a spherical lens, a non-spherical lens, a Fresnel lens and a microarray lens.

Meanwhile, the prism refers to any molded article having at least two polished surfaces which are at least not parallel to each other and are formed at a certain angle. Illustrative examples of the prism include a rectangular prism, a Porro prism, a direct vision prism, a pentagonal prism, a Daubresse prism, a Henzolt prism, a Spreng prism, a Mohler prism, a Wollaston prism, an inclined prism and an Abbe prism.

The light path converting part is molded by any method such as an injection molding method, a compression molding method, an injection compression molding method, an extrusion method and a solution casting method. From the viewpoints of ease of molding and costs, the light path converting part is particularly preferably molded by the injection molding method or the injection compression molding method.

The light path converting part preferably shows a transmittance at 550 nm of 80% or higher, more preferably 85% or higher, as a molded plate.

Since the light path converting part of the present invention has good optical properties as described above, it can be suitably used as an optical member for electrical and electronic equipment such as a camera, a digital camera, a liquid crystal display, a liquid crystal projector, a copying machine and an optical disk related equipment and as a light path converting part such as a splitter or an integrator in optical communication devices.

The light path converting part is preferably a pickup lens, a camera lens, a microarray lens, a projector lens or a prism.

The light path converting part of the present invention has good heat resistance and thermal stability, a very little birefringence and excellent transparency.

<Third Aspect: Optical Disk>

A third aspect of the present invention relates to an optical disk having excellent rigidity and water absorption resistance.

In general optical disks (hereinafter abbreviated as "CD disks") such as CD and CD-ROM, embossed pits corresponding to recorded data are formed on one surface of a 1.2-mm-thick transparent substrate, and a reflective film made of Al or the like is further formed on the surface. Data recorded on such a CD disk are reproduced by irradiating the other surface of the transparent substrate on which the reflective film is not formed with a focused beam.

In contrast, in DVD and DVD-ROM disks (hereinafter abbreviated as "DVD disks") having higher recording densities, finer embossed pits than those for the CD disk are formed on one surface of a 0.6-mm-thick transparent substrate, and a reflective film made of Al or the like is further formed on the surface. As in the case of the CD disk, data recorded on the recording surface of such a DVD disk are reproduced by irradiating the other surface of the transparent substrate on which the reflective film is not formed with a focused beam.

As a material of the 0.6-mm-thick substrate, PC (polycarbonate) which is a transparent resin material is generally used. A 0.6-mm-thick PC substrate has insufficient mechanical properties and warps as it is. Hence, two 0.6-mm-thick PC substrates are laminated together such that their recording surfaces contact with each other. Thereby, mechanical properties are secured as a disk having a total thickness of 1.2 mm.

The reason why the thickness of the substrate of the DVD disk is 0.6 mm is to secure a tilt margin. As a track pitch and a pit density increase, a margin for the tilt of the disk decreases. The tilt margin can be secured by reducing the thickness of the substrate from 1.2 mm to 0.6 mm. However, since the elastic modulus of a substrate is proportional to the cube of the thickness thereof from the viewpoint of strength of materials, deterioration in tilt properties which occurs in a substrate production process cannot be avoided.

Meanwhile, in the optical disks, in order to increase a transmission rate in writing and reading data along with the above increase in density, it is no longer avoidable to spin the disk substrate at higher speed.

However, in the case of the above constitution of the optical disks, it is difficult to avoid the occurrence of skew due to the following reasons (1) to (4):

(1) Upon injection: Stress is caused by shearing stress when a resin flows inside a cavity (molecular orientation distortion).
(2) Completion of filling: When the resin is filled in the cavity, the flow of the resin immediately stops as the motion of a screw stops quickly, whereby all inertial forces of the resin and the screw are applied to the substrate.
(3) Pressure Keeping: Since pressure is applied to the resin so as to prevent the back-flow of the resin and prevent the occurrence of sink caused by contraction in volume until the resin at the time of injection is gate sealed, pressure distribution occurs throughout the substrate.
(4) Cooling: Stress corresponding to temperature distribution occurs due to thermal shrinkage.

Accordingly, to improve the above constitution of the optical disks, "an optical recording medium in which at least a recording layer and a transparent protective layer are sequentially formed on a substrate and on which light enters from the transparent protective layer side so as to record and/or reproduce data signals, the above substrate comprising a first resin layer that forms a surface on which the above recording layer is formed and a second resin layer that is laminated on the above first resin layer and that comprises a resin material having a higher flexural modulus than a resin material forming the above first resin layer" is proposed (JP-A 11-242829).

Meanwhile, even if the problem of the mechanical properties is solved by the above improvement, optical disks using only one surface side for recording and reproducing signals undergo deformations due to water absorption caused by environmental changes in temperature and humidity.

In the case of the DVD disks, a general polycarbonate substrate showing a water absorption of 0.3 wt % or higher is used. However, since 0.6-mm-thick disks are bonded together such that their signal sides contact with each other, a good water absorption balance is achieved even if the water absorption is high, so that the resulting DVD disk is hardly deformed. However, in the case of high density disks having a high numerical aperture (N.A.), since signals exist on one side of a surface layer, a water absorption balance is varied, so that a problem of deformation by absorption of water occurs. Particularly, an abrupt change is liable to occur during operation of a drive because the temperature in the device is high and the humidity therein is low during the operation of the drive, and such a focus error that signals cannot be read due to deformation of a disk is liable to occur.

To inhibit such deformation caused by water absorption, "a disk-shaped data recording medium which comprises a substrate, a recording layer formed on the substrate so as to record data signals and a transparent protective layer laminated on the recording layer and on which data signals are recorded and reproduced by light entering from the transparent protective layer side, the substrate comprising a core layer made of resin and a surface layer made of resin, the surface layer being integrated with the core layer, having pits and projections of the data signals of the recording layer on one surface thereof and having higher flowability than the core layer", the surface layer of the substrate using a resin having a water absorption of 0.3 wt % or lower, is proposed (JP-A 2000-11449). The proposal suggests solving the problem by a complicated substrate configuration formed by two color formation or sandwich formation.

Thus, the substrate configuration has become very complicated so as to increase a recording density, secure a sufficient tilt margin and mechanical strength and prevent a deformation due to water absorption caused by environmental changes in temperature and humidity.

A potential cause thereof is unavailability of resins having satisfactory properties required as a resin used as a material of a substrate, i.e., rigidity, damping, heat resistance and water absorbability, in development of the optical disk. In particular, in the case of research and development of polycarbonate based resins which are widely used as optical disks, a wide variety of polycarbonate based resins have been developed for the purpose of improving the optical properties of the most commonly used polycarbonate resin to which 4,4'-dihydroxyphenylpropane is carbonate-bonded (JP-A 2000-327767, for example).

However, as described above, development of polycarbonate resins having improved rigidity, water absorbability, damping and heat resistance is still unsatisfactory, and it is earnestly desired to provide an optical disk having a simpler structure and a high recording density by use of a resin which facilitates design of the recording substrate, including moldability as well.

An object of the third aspect of the present invention is to provide an optical disk having a simple structure and excellent rigidity, damping, heat resistance and water absorbability.

(Structure)

The optical disk of the present invention is an optical disk that comprises a substrate with a thickness of 0.3 to 1.2 mm which has embossed pits or guide grooves, a reflective layer formed on the substrate and a transparent protective layer with a thickness of 3 to 200 μm which is formed on the reflective layer and that reproduces recorded data based on a change in the light intensity of reflected light produced by irradiating the disk with a light beam from the transparent protective layer side.

For example, the optical disk of the present invention, as shown in FIG. 1, is formed by laminating a light reflecting layer 3, a recording layer 4 and a transparent protective layer 5 sequentially on a substrate 2 having guide grooves (optical disk 1). On the top surface of the substrate 2, phase pits for recording data and tracking servo signals and guide grooves comprising a given uneven pattern such as fine pits and projections, e.g., pregrooves, are formed.

Figure 2:
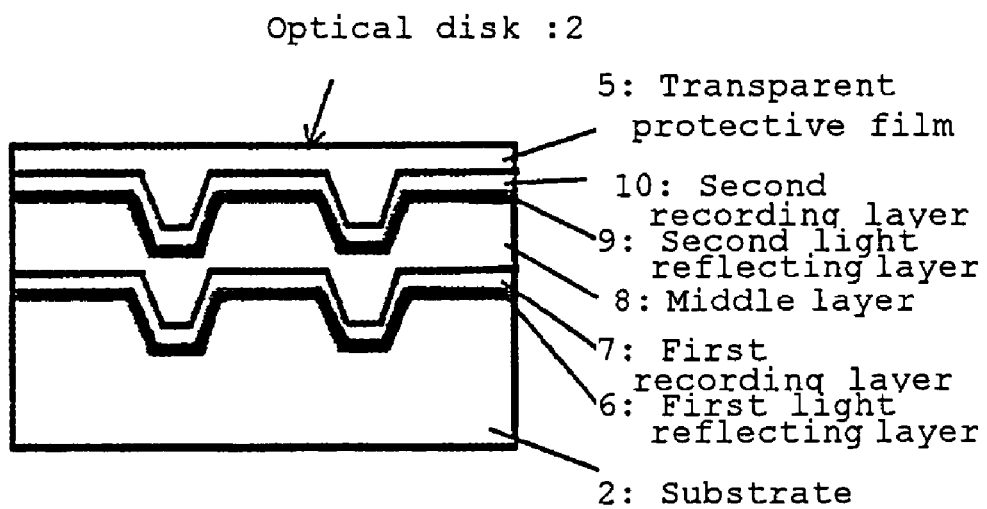
FIG. 2 is a partial schematic view of a vertical cross section of a disk in one embodiment of the optical disk of the present invention.

Further, an optical disk 2, as shown in FIG. 2, has such a multilayer structure that a recording film or a reflective layer and a transparent protective layer are laminated on a substrate 2 having guide grooves multiple times. For the substrates, light reflecting layer, recording layers and transparent protective layers constituting these disks, materials having the same or similar properties can be used.

The optical disk preferably has a recording layer between the reflective layer and the transparent protective layer. Further, the embossed pits or guide grooves are preferably formed on both surfaces of the substrate of the optical disk, reflective layer, recording layer and/or transparent protective layer are/is also formed on both surface thereof. In addition, the optical disk preferably has a multilayer structure that the recording layer or the reflective layer is laminated multiple times. Further, the transparent protective layer of the optical disk of the present invention is preferably constituted by the same polycarbonate copolymer as a polycarbonate copolymer constituting the substrate.

(Polycarbonate Copolymer)

A polycarbonate copolymer used as a material of the optical disk of the present invention comprises 20 to 95 mol %, preferably 25 to 70 mol %, more preferably 30 to 60 mol % of recurring unit (component a) represented by a general formula (I).

Another component of the copolymer comprises 80 to 5 mol %, preferably 75 to 30 mol %, more preferably 70 to 40 mol % of recurring unit (component b) represented by a general formula (II).

When the proportion of the recurring unit represented by the general formula (I) is lower than 20 mol %, an optical disk having unsatisfactory transparency, heat resistance, mechanical physical properties, oblique incident birefringence, water absorption, rigidity, transferability or warpage may be obtained.

The polycarbonate copolymer used in the present invention must contain the recurring unit (component a) represented by the general formula (I) in a certain proportion and also contains the recurring unit (component b) represented by the general formula (II) as another component so as to obtain desired flowability, rigidity and water absorption resistance.

In particular, a polycarbonate copolymer comprising 20 to 95 mol % of the recurring unit represented by the general formula (I) and 80 to 5 mol % of recurring unit represented by a general formula (II-2) and/or recurring unit represented by a general formula (II-3) is preferred.

Above all, a polycarbonate copolymer comprising 20 to 70 mol %, preferably 30 to 60 mol %, of the recurring unit represented by the general formula (I) and 80 to 30 mol %, preferably 70 to 40 mol %, of the recurring unit represented by the general formula (II-2) is preferred.

In addition, a polycarbonate copolymer comprising 20 to 70 mol %, preferably 30 to 60 mol %, of the recurring unit represented by the general formula (I) and 80 to 30 mol %, preferably 70 to 40 mol %, of the recurring unit represented by the general formula (II-3) is preferred.

In the optical disk of the present invention, the substrate shows:

(A) a flexural modulus of 2,800 to 4,000 MPa,
(B) a water absorption of 0.3 wt % or lower upon reaching saturation,
(C) a tan δ measured at 40° C. and 18 Hz in accordance with ISO 6721-4 of at least 0.020, and
(D) a deflection temperature under load measured under a load of 1.81 MPa in accordance with ISO 75-1, -2 of 110° C. or higher.

(Flexural Modulus)

The polycarbonate copolymer has a flexural modulus measured in accordance with ISO178 of 2,800 to 4,000 MPa, more preferably 2,900 to 3,900 MPa, much more preferably 3,100 to 3,900 MPa. When the flexural modulus is lower than 2,800 MPa, severe surface swing occurs when a molded optical disk spins at high speed, which is undesirable as an optical disk having a high density storage capacity. Meanwhile, when the flexural modulus is higher than 4,000 MPa, a brittle optical disk is formed, and molding may be difficult to carry out.

(Water Absorption)

The polycarbonate copolymer has a water absorption measured in accordance with ISO62 upon reaching saturation at 23° C. of 0.3 wt % or lower, preferably 0.28 wt % or lower. When the water absorption is higher than 0.3 wt %, an optical disk having a metal film formed on the surface of an optical disk substrate is liable to warp due to absorption of water and is therefore liable to have tracking errors. A water absorption of 0.27 wt % or lower is particularly preferred.

(tan δ)

The polycarbonate copolymer has a tans measured at 40° C. and 18 Hz in accordance with ISO 6721-4 of at least 0.020, more preferably at least 0.025, much more preferably at least 0.027. When the tan δ is smaller than 0.020, the damping of the resin is small, so that severe surface swing occurs when a molded optical disk spins at high speed disadvantageously.

(Deflection Temperature Under Load)

The polycarbonate copolymer shows a deflection temperature under load measured under a load of 1.81 MPa in accordance with ISO 75-1, -2 of 110° C. or higher, preferably 115° C. or higher, more preferably 120° C. or higher. When the deflection temperature under load is low, heat resistance as a disk is unsatisfactory. The deflection temperature under load is generally 150° C. or lower, preferably 140° C. or lower, when the polycarbonate copolymer is used in general injection molding.

(Specific Viscosity)

The polycarbonate copolymer preferably shows a specific viscosity of 0.1 to 0.5, more preferably 0.15 to 0.4, which is measured at 20° C. after 0.7 g of the copolymer is dissolved in 100 ml of methylene chloride. With the specific viscosity within the above range, the polycarbonate copolymer has good melt flowability and excellent moldability.

(Warpage)

To measure warpage of the optical disk during water absorbing and drying processes, the following measurement method has been used. That is, after the disk is exposed to an environment (environment A) where the temperature is 30° C. and the humidity is 90% RH until reaching saturated water absorption, the disk is transferred to an environment (environment B) where the temperature is 23° C. and the humidity is 50% RH, a tilt change at 58 mm from the center which occurs due to the change of the environment is measured with time, and the maximum value of the tilt change and a value at which the tilt change is settled are compared with each other so as to determine a difference (ΔTilt). The ΔTilt of the optical disk at that time is within 1.00 degree, preferably within 0.75 degrees, more preferably within 0.60 degrees.

Further, in the case of the optical disk of the present invention, since data signals are recorded and reproduced by light entering from the transparent protective layer 5 side, the substrate 2 does not affect optical recording and reproduction properties and does not require transparency. Although a blend material of at least two resins having significantly different refractive indices has heretofore not been easily used as a substrate material for CD, DVD or the like which requires conventional optical properties because the blend material has haze due to light scattering, the substrate 2 of the present invention can use even such a blend material, as described above.

To the optical disk substrate of the present invention, other thermoplastic resins and additives such as a light stabilizer, a coloring agent, an antistatic agent and a lubricant may be added in such amounts that do not impair transferability and the effect of reducing the occurrence of warpage in water absorbing and drying processes of a molded disk.

As a mixing method, for example, a vessel equipped with an agitator is primarily conceivable for a polymer solution, and a method of carrying out mixing by use of a tumbler, a V-shaped blender, a Nauter mixer, a Banbury mixer, a kneading roller, an extruder or the like is used for a molded article such as powder or pellets. In any case, any method can be employed. However, in consideration of ease of removal of foreign matter mixed in during a mixing process, a method comprising causing the resulting mixture to pass through a filter having appropriate openings after mixing in the state of a polymer solution is preferred.

Further, in an extrusion step (pelletization step) of obtaining a pellet-shaped resin composition to be injection-molded, the molten polymer is preferably passed through a sintered metal filer with a filtration accuracy of 50 μm or lower so as to remove foreign matter. If necessary, such an additive as a phosphorus based antioxidant is also preferably added. In any event, a raw material resin before injection molding must have the contents of foreign matter, impurities and solvents reduced to the minimum.

(Production Method of Optical Disk)

Next, a production method of the optical disk will be described.

An optical disk substrate is produced from the above polycarbonate copolymer by an injection molding method using an injection molding machine (including an injection compression molding machine) equipped with a stamper having surface roughness and pitches and grooves which satisfy specifications required for optical disks. In this case, the thickness of the disk substrate is 0.3 to 1.2 mm.

The injection molding machine may be a generally used machine. However, from the viewpoints of inhibiting production of carbides and increasing the reliability of the disk substrate, a machine whose cylinder and screw show low adhesion to the resin and which is made of a material having corrosion resistance and abrasion resistance is preferably employed. The environment in the molding step is preferably as clean as possible in consideration of the object of the present invention. Further, it is important to fully dry the material to be molded so as to remove water and be careful not to have retention which may incur decomposition of the molten resin.

Then, at least a reflective film is formed on one surface of the optical disk substrate so as to give an optical disk. As a material thereof, metal elements may be used alone or in combination of two or more. Of these, Al alone, Au alone, an Al alloy containing 0.5 to 10 wt %, particularly preferably 3.0 to 10 wt % of Ti or an Al alloy containing 0.5 to 10 wt % of Cr is preferably used. Further, the reflective film can be formed by such means as ion beam sputtering, DC sputtering or RF sputtering.

In general, in addition to this thin metal film (reflective layer), the recording layer 4 (a phase change film or a dye in the case of DVD-RAM and DVD-R and a magneto optical recording film in the case of a magneto optical disk) and the transparent protective layer 5 are basically formed so as to form the optical disk of the present invention.

As the phase change film, chalcogen or a chalcogen compound is used, for example. More specifically, Te, Se and chalcogenite based materials such as Ge—Sb—Te, Ge—Te, In—Sb—Te, In—Se—Te—Ag, In—Se, In—Se—Tl—Co, In—Sb—Se, $Bi_2Te_3$, BiSe, $Sb_2Se_3$ and $Sb_2Te_3$ are used.

Further, as the magneto optical recording film, a perpendicular magnetic film having magnetooptic properties such as the Kerr effect and the Faraday effect, e.g., a thin amorphous alloy film such as Tb—Fe—Co, is used.

Then, the transparent protective film 5 is formed on the recording layer 4. The transparent protective layer 5 is made of a material which allows a laser beam to pass therethrough. Illustrative examples of the material include thermoplastic resins such as a polycarbonate and an amorphous polyolefin-based resin and thermosetting resins. In particular, a polycarbonate resin comprising biscresol fluorene in an amount of at least 20 mol % based on all aromatic dihydroxy components is suitably used.

Illustrative examples of means for forming the transparent protective film include a method comprising applying a sheet made of a thermoplastic resin such as a polycarbonate or an amorphous polyolefin based resin or a transparent plate such as a glass plate on the recording layer 4, and a method comprising coating an ultraviolet curing resin by a technique such as spin coating and then irradiating the coated resin with ultraviolet so as to form the transparent protective film. Further, the thickness of the transparent protective film is limited to 3 to 200 μm in order to keep a coma aberration as small as possible.

Although the basic constitution of the optical disk of the present invention has so far been described, dielectric layers may be added to the constitution so as to control optical properties and thermal properties. In this case, on the substrate 2, the light reflecting layer 3, a first dielectric layer, the recording layer 4, a second dielectric layer, and the transparent protective layer 5 are formed sequentially.

The optical disk of the present invention is suitable for use as a recording medium having excellent rigidity, damping, heat resistance and water absorbability and a high density recording capacity.

<Fourth Aspect: Plastic Mirror>

A fourth aspect of the present invention relates to a plastic mirror. More specifically, it relates to a plastic mirror formed from a polycarbonate copolymer which has an excellent flexural modulus, flowability, water absorption resistance and heat resistance and is capable of very precise printing on the surface of a mold.

Polycarbonate resins are widely used in a variety of fields because they have excellent transparency, heat resistance, mechanical properties and dimensional stability. In recent years, they have been actively used for plastic mirrors due to the advantage of transparency thereof.

Meanwhile, to comply with recent reductions in weight, thickness, length and size and high speed rotations of a rotating mirror, resins having improved melt flowability, mold printability, dimensional stability and rigidity are desired.

Further, a request for higher dimensional stability against absorption of water for plastic mirrors has been increasingly intense.

An object of the fourth aspect of the present invention is to provide a plastic mirror which satisfies rigidity, water absorption resistance, a flexural modulus and precise printability to a mold and has excellent melt flowability and heat resistance.

The plastic mirror of the fourth aspect of the present invention comprises a polycarbonate substrate and a metallic reflective film, the polycarbonate substrate comprising a polycarbonate copolymer, the polycarbonate copolymer comprising 20 to 70 mol %, preferably 30 to 60 mol %, of recurring unit (component a) represented by a general formula (I) and 80 to 30 mol %, preferably 70 to 40 mol %, of recurring unit (component b) represented by a general formula (II-1) and/or a general formula (II-2), the polycarbonate substrate showing:

(A) a glass transition temperature of 120 to 230° C.,
(B) a water absorption of 0.2 wt % or lower after immersed in water at 23° C. for 24 hours, and
(C) a flexural modulus of 2,500 to 4,000 MPa.

The plastic mirror is preferably such that the polycarbonate copolymer preferably comprises 20 to 70 mol %, preferably 30 to 60 mol %, of the recurring unit (component a) represented by the general formula (I) and 80 to 30 mol %, preferably 70 to 40 mol %, of the recurring unit (component b) represented by the general formula (II-1) and that the polycarbonate substrate shows the following properties, i.e.,
(A) a glass transition temperature of 160 to 230° C.,
(B) a water absorption of 0.2 wt % or lower after immersed in water at 23° C. for 24 hours, and
(C) a flexural modulus of 2,500 to 3,500 MPa.

The plastic mirror is also preferably such that the polycarbonate copolymer preferably comprises 20 to 70 mol %, preferably 30 to 60 mol %, of the recurring unit (component a) represented by the general formula (I) and 80 to 30 mol %, preferably 70 to 40 mol %, of the recurring unit (component b) represented by the general formula (II-2) and that the polycarbonate substrate shows the following properties, i.e.,
(A) a glass transition temperature of 120 to 180° C.,
(B) a water absorption of 0.1 wt % or lower after immersed in water at 23° C. for 24 hours, and
(C) a flexural modulus of 2,800 to 4,000 MPa.

(Glass Transition Temperature)

The polycarbonate copolymer has a glass transition temperature of 120 to 230° C.

(Water Absorption)

The polycarbonate copolymer has a water absorption measured in accordance with ISO62 after immersed in water at 23° C. for 24 hours of 0.2 wt % or lower, preferably 0.1 wt % or lower. When the water absorption is higher than 0.2 wt %, a plastic mirror having a reflective film formed on a substrate for a plastic mirror is apt to warp due to absorption of water disadvantageously. A water absorption of 0.085 wt % or lower is particularly preferred.

(Flexural Modulus)

The polycarbonate copolymer has a flexural modulus measured in accordance with ISO178 of 2,500 to 4,000 MPa, more preferably 2,800 to 4,000 MPa, much more preferably 2,500 to 3,500 MPa. When the flexural modulus is lower than 2,500 MPa, it is difficult to make the thickness of a molded article small due to insufficient rigidity. Meanwhile, when the flexural modulus is higher than 4,000 MPa, a brittle substrate for a plastic mirror is formed, and molding may be difficult to carry out.

(Specific Viscosity)

The polycarbonate copolymer preferably shows a specific viscosity of 0.1 to 0.5, more preferably 0.15 to 0.4, which is measured at 20° C. after 0.7 g of the copolymer is dissolved in 100 ml of methylene chloride. With the specific viscosity within the above range, the polycarbonate copolymer has good melt flowability and excellent moldability, and a molded article having optically satisfactory strength is obtained advantageously.

(Flowability)

The polycarbonate copolymer preferably shows a flowability in terms of an MVR value under measurement conditions of 300° C. and 1.2 kgf of 5 cm$^3$/10 min or higher, more preferably 20 cm$^3$/10 min or higher, much more preferably 30 cm$^3$/10 min or higher.

(Other Copolymerizable Components)

In the polycarbonate copolymer, the components a and b desirably constitute at least 80 mol %, preferably at least 90 mol %, of all aromatic dihydroxy components. However, the polycarbonate copolymer may also contain other dihydroxy components in an amount of not larger than 20 mol %, preferably not larger than 10 mol %, of all aromatic dihydroxy components.

The other copolymerizable components may be any components other than the component a and the component b which are commonly used as dihydroxy components of an aromatic polycarbonate. Illustrative examples of such copolymerizable components include hydroquinone, resorcinol, 4,4'-biphenol, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)-1-phenylethane, 1,1-bis(4-hydroxyphenyl)cyclohexane, 2,2-bis(4-hydroxyphenyl)pentane, 4,4'-(p-phenylenediisopropylindene)diphenol, 9,9-bis(4-hydroxyphenyl)fluorene, and 1,1-bis(4-hydroxyphenyl)-4-isopropylcyclohexane.

(Metallic Reflective Film)

As the metallic reflective film, a thin film made of aluminum or the like is used.

The plastic mirror molding material of the present invention is generally obtained by injection molding a polycarbonate resin at a resin temperature of 260 to 340° C. and a mold temperature of 60 to 130° C. or obtained by laminating the injection molded articles together.

(Shape)

The plastic mirror of the present invention is a spherical, non-spherical, hollow, flat or polyhedral mirror which is primarily used in office automation equipment. Particularly, the plastic mirror of the present invention is a polygonal mirror, a projector mirror or a film mirror but is not limited to these mirrors.

The plastic mirror of the present invention is formed by a polycarbonate copolymer having low water absorption and a specific flexural modulus at a specific glass transition temperature. Therefore, it has high rigidity and excellent dimensional stability and mold printability at the time of molding.

<Fifth Aspect: Conductive Resin Composition, Carrying Tray>

A fifth aspect of the present invention relates to a conductive resin composition. More specifically, it relates to a conductive resin composition having good heat resistance, excellent conductivity and low water absorption and causing no irritation to skin. Further, the fifth aspect of the present invention relates to a carrying tray made of the resin composition and used for electronic parts such as semiconductors, optical data recording media and hard disks.

A polycarbonate resin is widely used in a variety of fields, alone or as a resin composition which also contains other thermoplastic resins, glass fibers, carbon fibers and the like, in a wide variety of fields as engineering plastic because it has excellent transparency, heat resistance, mechanical properties and dimensional stability. However, in recent years, materials having excellent heat resistance and conductivity are desired.

As a material having improved heat resistance, a resin composition comprising a polycarbonate copolymer having the structure of 9,9-bis(4-hydroxyphenyl)fluorene and an inorganic filler is known (JP-A 7-268197).

However, the composition has a problem that 9,9-bis(4-hydroxyphenyl)fluorene has low reactivity at the time of polymerization, so that it is difficult to obtain the polycarbonate copolymer.

Further, it has been considered a problem that steam derived from 9,9-bis(4-hydroxyphenyl)fluorene which is produced by decomposition at the time of melt extrusion or molding is highly irritating to skin.

Further, the polycarbonate copolymer comprising 9,9-bis(4-hydroxyphenyl)fluorene has a problem of having high water absorption and poor mechanical properties.

An object of the fifth aspect of the present invention is to provide a conductive resin composition having heat resistance and conductivity, causing no irritation to skin and having low water absorption, and a tray for conveying electronic parts which comprises the resin composition.

The conductive resin composition comprises a polycarbonate copolymer and a carbon based filler. The polycarbonate copolymer comprises 5 to 95 mol %, preferably 7 to 90 mol %, more preferably 10 to 85 mol %, of recurring unit (component a) represented by a general formula (I) and 95 to 5 mol %, preferably 93 to 10 mol %, more preferably 90 to 15 mol %, of recurring unit (component b) represented by a general formula (II).

When the content of the recurring unit represented by the general formula. (I) is lower than 5 mol %, it is difficult to improve heat resistance to a sufficient degree. Meanwhile, when the content of the recurring unit represented by the general formula (I) is higher than 95 mol %, the melt flowability of the resin composition is low, and molding is difficult accordingly.

As the polycarbonate copolymer, a copolymer comprising 5 to 95 mol %, preferably 7 to 90 mol %, more preferably 10 to 85 mol %, of the recurring unit represented by the general formula (I) and 95 to 5 mol %, preferably 93 to 10 mol %, more preferably 90 to 15 mol %, of the recurring unit represented by the general formula (II-1) is preferred.

(Specific Viscosity)

The polycarbonate copolymer preferably shows a specific viscosity of 0.17 to 0.55, more preferably 0.21 to 0.45, which is measured at 20° C. after 0.7 g of the copolymer is dissolved in 100 ml of methylene chloride.

(Glass Transition Temperature)

The polycarbonate copolymer preferably shows a glass transition temperature (Tg) of not lower than 150° C. which is measured at a temperature increasing rate of 20° C./min. The Tg is more preferably 155° C.

(Carbon Based Filler)

Meanwhile, illustrative examples of the carbon based filler constituting the conductive resin composition of the present invention include carbon fibers, carbon blacks, graphites, carbon nanotubes and fullerenes. In view of an conductivity improving effect and costs, the carbon fibers and the carbon blacks are particularly preferred.

The carbon fibers are not particularly limited and are various known carbon fibers, e.g., carbonaceous fibers and graphitic fibers produced by use of a polyacrylonitrile, cellulose, pitch, rayon, lignin, a hydrocarbon gas or the like, and polyacrylonitrile based carbon fibers having excellent fiber strength are particularly preferred. Further, the carbon fibers may have surfaces thereof oxidation-treated by a currently known method as typified by ozone, plasma, nitric acid or electrolysis. The oxidation treatment is preferably carried out so as to increase adhesion to the resin component. The carbon fibers are generally in the form of a chopped strand, a roving strand, a milled fiber or the like.

To impart conductivity or the like to the carbon fibers, the surfaces of the fibers may be metal-coated. The diameter of a metal coated carbon fiber is particularly preferably 6 to 20 μm. The metal coated carbon fiber is a carbon fiber on which a metal such as nickel, copper, cobalt, silver, aluminum, iron or an alloy thereof has been coated by a known plating method, evaporation method or the like. The metal is preferably one or more metals selected from nickel, copper and cobalt from the viewpoints of conductivity, corrosion resistance, productivity and economical efficiency. The metal coated carbon fiber is particularly preferably a nickel coated carbon fiber.

Further, as these carbon fibers, those converged by a sizing agent such as an epoxy resin, an urethane resin or an acrylic resin can be suitably used. The epoxy resin and/or the urethane resin are/is preferably used.

Illustrative examples of the carbon blacks include conventionally known ketjenblack, acetylene black, furnace black, lamp black, thermal black, channel black, roll black and disk black. Of these carbon blacks, ketjenblack, acetylene black and furnace black are particularly preferred.

The conductive resin composition of the present invention comprises the above polycarbonate copolymer and carbon based filler, and the contents of the components vary depending on situations. However, the content of the polycarbonate copolymer is generally 40 to 99 wt %, preferably 50 to 90 wt %, and the content of the carbon based filler is generally 60 to 1 wt %, preferably 50 to 10 wt %. When the content of the carbon based filler is lower than 1 wt %, the effect of improving conductivity is liable to become small, while when the content of the carbon based filler is higher than 60 wt %, flowability deteriorates, whereby kneading and molding of the resin may become difficult to carry our disadvantageously.

(Inorganic Filler)

In the present invention, various inorganic fillers may be added in addition to the above carbon based filler so as to improve the rigidity or conductivity of the resin. As these inorganic fillers, glass materials, metal based fillers and various mineral fillers can be named.

As the glass materials used as the inorganic fillers, glass fibers, glass milled fibers, glass beads, glass flakes and glass powders can be used, for example.

The glass materials used are not limited to particular glass compositions such as A glass, C glass and E glass and may contain such components as $TiO_2$, $Zr_2O$, $BeO$, $CeO_2$, $SO_3$ and $P_2O_5$ in some cases. However, more preferably, E glass (alkali-free glass) is preferred because it does not adversely affect the polycarbonate copolymer.

The glass fibers are formed by quenching molten glass while stretching the glass into a given fiber form by various methods. Quenching and stretching conditions in the case are also not particularly limited. As for the shape of a cross section, glass fibers having various irregularly shaped cross sections typified by perfectly circular fibers piled together parallel to one another may be used in addition to common perfectly circular glass fibers. Further, a mixture of glass fibers having a perfectly circular cross section and irregularly shaped cross sections may also be used.

The glass fibers have an average fiber diameter of 1 to 25 μm, preferably 5 to 17 μm. When glass fibers having an average fiber diameter of smaller than 1 μm are used, moldability deteriorates, while when glass fibers having an average fiber diameter of larger than 25 μm are used, the appearance is damaged, and a reinforcing effect is not sufficient.

To impart conductivity or the like to the glass fibers, the surfaces of the fibers may be metal-coated. The diameter of the metal coated glass fiber is particularly preferably 6 to 20 μm. The metal coated glass fiber is a glass fiber on which a metal such as nickel, copper, cobalt, silver, aluminum, iron or an alloy thereof has been coated by a known plating method, evaporation method or the like. The metal is preferably one or more metals selected from nickel, copper and cobalt from the viewpoints of conductivity, corrosion resistance, productivity and economical efficiency.

The metal based fillers used in the present invention do not need to be particularly limited and refer to metal fibers, metal coated fibers and metal flakes. Illustrative examples of materials thereof include metals such as stainless steel, aluminum, copper and brass. These can be used in combination of two or more. The diameter of the metal fiber is preferably 4 to 80 μm, particularly preferably 6 to 60 μm.

As the glass flakes and metal flakes used in the present invention, those having an average particle diameter of 10 to 1,000 microns are preferred. Further, when the average particle diameter is (a) and the thickness is (c), those having an (a)/(c) ratio of 5 to 500 are preferred, those having an (a)/(c) ratio of 6 to 450 are more preferred, and those having an (a)/(c) ratio of 7 to 400 are much more preferred. When the average particle diameter is smaller than 10 microns or the (a) (c) ratio is smaller than 5, rigidity is unsatisfactory. Meanwhile, when the average particle diameter is larger than 1,000 microns or the (a)/(c) ratio is larger than 500, a molded article having a poor appearance and low Weld strength is obtained disadvantageously. The average particle diameter of the glass flakes and metal flakes is calculated as a median diameter of weight distribution of particle sizes determined by a standard sieve method.

In addition, as the various mineral fillers, whiskers such as potassium titanate whiskers, aluminum borate whiskers, silicon carbide whiskers and silicon nitride whiskers, calcium carbonate, magnesium carbonate, dolomite, silica, diatomaceous earth, alumina, iron oxide, zinc oxide, magnesium oxide, calcium sulfate, magnesium sulfate, calcium sulfite, talc, clay, mica, kaolin, asbestos, calcium silicate, montmorillonite, bentonite, wollastonite, graphite, iron powder, lead powder and aluminum powder can be used, for example.

The inorganic fillers are preferably surface-treated by a silane coupling agent, a titanate coupling agent, an aluminum coupling agent or the like. The silane coupling agent is particularly preferred. By this surface treatment, decomposition of the polycarbonate copolymer is inhibited and adhesion is further improved, so that mechanical properties which are an object of the present invention can be improved.

The silane coupling agent is a silane compound represented by the following formula:

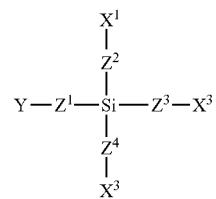

(wherein Y is a group having reactivity or an affinity with a resin matrix, such as an amino group, an epoxy group, a carboxylic acid group, a vinyl group, a mercapto group or a halogen atom, $Z^1$, $Z^2$, $Z^3$ and $Z^4$ each represent a single bond or an alkylene group having 1 to 7 carbon atoms, the alkylene molecular chain may contain an amide linkage, an ester linkage, an ether linkage or an imino linkage, and $X^1$, $X^2$ and $X^3$ each represent an alkoxy group, preferably an alkoxy group having 1 to 4 carbon atoms or a halogen atom.)

Specific examples of the silane compound include vinyltrichlorsilane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, N-β(aminoethyl)γ-aminopropyltrimethoxysilane, γ-aminopropyltriethoxysilane, N-phenyl-γ-aminopropyltrimethoxysilane, γ-mercaptopropyltrimethoxysilane and γ-chloropropyltrimethoxysilane.

Further, these metal based fillers may be converged by an olefin resin, a styrene resin, a polyester resin, an epoxy resin, an urethane resin or the like. These fibrous fillers may be used alone or in combination of two or more.

(Flame Retardant)

The conductive resin composition of the present invention may contain a flame retardant in such an amount that does not impair the object of the present invention.

Illustrative examples of the flame retardant include a polycarbonate type flame retardant of halogenated bisphenol A, an organic salt based flame retardant, an aromatic phosphoric ester based flame retardant, a halogenated aromatic phosphoric ester type flame retardant, a fluorine based flame retardant and a siloxane based flame retardant. The composition may contain one or more of these flame retardants.

Specific examples of the polycarbonate type flame retardant of halogenated bisphenol A include a polycarbonate type flame retardant of tetrachlorobisphenol A, a copolymerized polycarbonate type flame retardant of tetrachlorobisphenol A and bisphenol A, a polycarbonate type flame retardant of tetrabromobisphenol A, and a copolymerized polycarbonate type flame retardant of tetrabromobisphenol A and bisphenol A.

Specific examples of the organic salt based flame retardant include dipotassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-dibromo-4-cumylphenyl)phosphate, sodium bis(4-cumylphenyl)phosphate, potassium bis(p-toluenesulfone)imide, potassium bis(diphenylphosphoric acid)imide, potassium bis(2,4,6-tribromophenyl)phosphate, potassium bis(2,4-dibromophenyl)phosphate, potassium bis(4-bromophenyl)phosphate, potassium diphenylphosphate, sodium diphenylphosphate, potassium perfluorobutanesulfonate, sodium lauryl sulfate, potassium lauryl sulfate, sodium hexadecyl sulfate, and potassium hexadecyl sulfate.

Specific examples of the halogenated aromatic phosphoric ester type flame retardant include tris(2,4,6-tribromophenyl)phosphate, tris(2, 4-dibromophenyl)phosphate and tris(4-bromophenyl)phosphate.

Specific examples of the aromatic phosphoric ester based flame retardant include triphenyl phosphate, tris(2,6-xylyl)phosphate, tetrakis(2,6-xylyl)resorcin diphosphate, tetrakis(2,6-xylyl)hydroquinone diphosphate, tetrakis(2,6-xylyl)-4,4'-biphenol diphosphate, tetraphenyl resorcin diphosphate, tetraphenyl hydroquinone diphosphate, tetraphenyl-4,4'-biphenol diphosphate, an aromatic polyphosphate whose aromatic ring sources are resorcin and phenol and which contains no phenolic OH group, an aromatic polyphosphate whose aromatic ring sources are resorcin and phenol and which contains a phenolic OH group, an aromatic polyphosphate whose aromatic ring sources are hydroquinone and phenol and which contains no phenolic OH group, an aromatic polyphosphate whose aromatic ring sources are hydroquinone and phenol and which contains a phenolic OH group (hereinafter, "aromatic polyphosphate" refers to both an aromatic polyphosphate containing a phenolic OH group and an aromatic polyphosphate containing no phenolic OH group), an aromatic polyphosphate whose aromatic ring sources are bisphenol A and phenol, an aromatic polyphosphate whose aromatic ring sources are tetrabromobisphenol A and phenol, an aromatic polyphosphate whose aromatic ring sources are resorcin and 2,6-xylenol, an aromatic polyphosphate whose aromatic ring sources are hydroquinone and 2,6-xylenol, an aromatic polyphosphate whose aromatic ring sources are bisphenol A and 2,6-xylenol, and an aromatic polyphosphate whose aromatic ring sources are tetrabromobisphenol A and 2,6-xylenol.

Of these flame retardants, as the polycarbonate type flame retardant of halogenated bisphenol A, the polycarbonate type flame retardant of tetrabromobisphenol A and the copolymerized polycarbonate of tetrabromobisphenol A and bisphenol A are preferred, and the polycarbonate type flame retardant of tetrabromobisphenol A is more preferred.

As the organic salt based flame retardant, dipotassium diphenylsulfone-3,3'-disulfonate, potassium diphenylsulfone-3-sulfonate and sodium 2,4,5-trichlorobenzenesulfonate are preferred.

As the aromatic phosphoric ester based flame retardant, triphenyl phosphate, tricresyl phosphate, cresyl diphenyl phosphate, resorcinol bis(dixylenylphosphate), bis(2,3-dibromopropyl)phosphate and tris(2,3-dibromopropyl)phosphate are preferred. Of these, triphenyl phosphate, tricresyl phosphate and resorcinol bis(dixylenylphosphate) that are aromatic phosphoric ester based flame retardants which do not cause destruction of the ozone layer are most preferred. As the fluorine based flame retardant, fluorinated polyolefins such as a fluorine resin, e.g., PTFE, particularly those which form fibrils are preferred. As the siloxane based flame retardant, a polysiloxane containing an aromatic ring is preferred.

(Other Resins)

The conductive resin composition of the present invention can also contain other resins in such an amount that does not impair the object of the present invention.

Illustrative examples of the other resins include a polyester resin such as a polyethylene terephthalate, a polybutylene terephthalate or a polyethylene naphthalate, a polyamide resin, a polyimide resin, a polyether imide resin, a polyurethane resin, a polyphenylene ether resin, a polyphenylene sulfide resin, a polysulfone resin, a polyolefin resin such as a polyethylene or a polypropylene, a polystyrene resin, an acrylonitrile/styrene copolymer (AS resin), an acrylonitrile/butadiene/styrene copolymer (ABS resin), a polymethacrylate resin, a phenol resin and an epoxy resin.

Further, illustrative examples of elastomer include isobutylene/isoprene rubber, styrene/butadiene rubber, ethylene/propylene rubber, acrylic elastomer, silicone rubber, polyester based elastomer, polyamide based elastomer, MBS rubber, and MAS rubber.

(Production of Conductive Resin Composition)

To produce the conductive resin composition of the present invention, any method is used. For example, a mixing method using a tumbler, a V-shaped blender, a super mixer, a NAUTA mixer, a Banbury mixer, a kneading roller, an extruder or the like is used as appropriate. The thus obtained aromatic polycarbonate resin composition can be formed into a molded article, directly or after pelletized in a melt extruder, by a generally known method such as an injection molding method, an extrusion method or a compression molding method. Further, to improve the miscibility of the aromatic polycarbonate resin composition and obtain stable mold releasability and physical properties, use of a twin-screw extruder in melt extrusion is preferred. In addition, when the inorganic filler is added, any of a method comprising adding the filler directly from the opening of the hopper of an extruder or from the middle portion of the extruder, a method comprising mixing the filler with the polycarbonate copolymer in advance, a method comprising mixing the filler with a portion of the polycarbonate copolymer in advance so as to prepare a master and then adding the master and a method comprising adding the master from the middle portion of the extruder can be employed.

The conductive resin composition of the present invention preferably has a surf ace resistivity value measured in accordance with ASTM D257 of $1 \times 10^{12}$ or smaller, more preferably $1 \times 10^{10}$ or smaller, most preferably $1 \times 10^8$ or smaller. When the surface resistivity value is larger than $1 \times 10^{12}$, conductivity becomes inadequate, and when the resin composition is used for a tray for conveying electronic equipment, the electronic equipment may be shorted disadvantageously.

The conductive resin composition of the present invention can be handled safely because steam of the polycarbonate copolymer which is produced at the time of melt extrusion or molding is free from irritating properties and is therefore not irritating to skin.

The thus obtained conductive resin composition of the present invention is useful for housings and chassis of office automation equipment such as a personal computer, a word processor, a facsimile, a copying machine and a printer, a carrying tray used for conveying a semiconductor, a memory or a hard disk at the time of production of these components, OA internal parts such as a tray, chassis, a turn table, a pickup chassis and gears for optical disks and magnetooptical disks such as CD, CD-ROM, CD-R, CD-RW, MO, DVD, DVD-ROM and DVD-R, housings and parts for household electrical appliances such as a television, a videotape player, a DVD player, a video game machine, an electrical washing machine, an electrical drying machine and a vacuum cleaner, electrical tools such as an electrically powered saw and an electrically powered drill, optical equipment parts such as a telescope tube, a microscope tube, a camera body, a camera housing and a camera tube, and meter panels for automobiles.

The conductive resin composition of the present invention has such an advantage that it has good heat resistance, excellent conductivity and low water absorption and causes no irritation to skin. Therefore, it is suitable for use as a carrying tray for electronic components such as a semiconductor, an optical recording medium and a hard disk.

(Production Method of Polycarbonate Copolymer)

The polycarbonate copolymers used in the present invention (including the first to fifth aspects) are produced by general reaction means known per se for producing a polycarbonate copolymer, e.g., a method comprising reacting an aromatic dihydroxy component with a carbonate precursor such as phosgene or carbonic acid diester. Next, basic means for the production method will be briefly described.

As the carbonate precursor, carbonyl halide, carbonate ester or haloformate is used. Specific examples thereof include phosgene, diphenyl carbonate, and dihaloformate of an aromatic dihydroxy component.

When the aromatic dihydroxy component and the carbonate precursor are reacted with each other by an interfacial polymerization or a fusion method so as to produce the polycarbonate resin, a catalyst, a terminal blocking agent and an antioxidant such as a dihydric phenol may be used as required.

A reaction by the interfacial polymerization method is generally a reaction between a dihydric phenol and phosgene and is carried out in the presence of an acid binder and an organic solvent. As the acid binder, an alkali metal hydroxide such as sodium hydroxide or potassium hydroxide or an amine compound such as pyridine is used. As the organic solvent, a halogenated hydrocarbon such as methylene chloride or chlorobenzene is used. Further, to accelerate the reaction, a catalyst such as a tertiary amine, a quaternary ammonium compound or a quaternary phosphonium compound, e.g., triethylamine, tetra-n-butyl ammonium bromide and tetra-n-butyl phosphonium bromide, can also be used. In that case, the reaction temperature is generally 0 to 40° C., the reaction time is about 10 minutes to 5 hours, and the pH during the reaction is preferably kept at 9 or higher.

A reaction by the fusion method is generally an ester exchange reaction between a dihydric phenol and carbonate ester and is carried out by a method comprising mixing the dihydric phenol with carbonate ester under heating in the presence of an inert gas and distilling out a produced alcohol or phenol. The reaction temperature varies according to the boiling point of the produced alcohol or phenol but generally ranges from 120° C. to 350° C. In the late stage of the reaction, the pressure in the system is reduced to about $1.3 \times 10^3$ to $1.3 \times 10$ Pa so as to facilitate distilling out the produced alcohol or phenol. The reaction time is generally about 1 to 4 hours.

Illustrative examples of carbonate ester include esters of an aryl group having 6 to 10 carbon atoms, an aralkyl group and an alkyl group having 1 to 4 carbon atoms which may be substituted. Specific examples thereof include diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate, and dibutyl carbonate. Of these, diphenyl carbonate is preferred.

(Polymerization Catalyst)

Further, to increase the rate of polymerization in the fusion method, a polymerization catalyst can be used. As the polymerization catalyst, catalysts which are generally used in an esterification reaction and an ester exchange reaction, e.g., alkali metal compounds such as sodium hydroxide, potassium hydroxide, a sodium salt of a dihydric phenol and a potassium salt of a dihydric phenol, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals and alkaline earth metals, organic salts of alkali metals and alkaline earth metals, zinc compounds, boron compounds, aluminum compounds, silicon compounds, germanium compounds, organotin compounds, lead compounds, osmium compounds, antimony compounds, manganese compounds, titanium compounds and zirconium compounds can be used. These catalysts may be used alone or in combination of two or more. The amount of the polymerization-catalyst is selected from a range of $1 \times 10^{-8}$ to $1 \times 10^{-3}$ equivalents, preferably $1 \times 10^{-7}$ to $1 \times 10^{-3}$ equivalents, more preferably $1 \times 10^{-6}$ to $5 \times 10^{-4}$ equivalents, per mole of the dihydric phenol which is a raw material.

(Terminal Blocking Agent)

In the polymerization reaction of the polycarbonate copolymer, a monofunctional phenol which is generally used as a terminal blocking agent can be used. Particularly, in the case of a reaction using phosgene as the carbonate precursor, the monofunctional phenol is generally used as a terminal blocking agent so as to adjust a molecular weight, and since the resulting polymer has its terminals blocked by groups based on the monofunctional phenol, the polymer has better thermal stability than those whose terminals are not blocked by the groups based on the monofunctional phenol.

The monofunctional phenol may be any monofunctional phenol which is used as a terminal blocking agent for a polycarbonate polymer and is generally exemplified by a monofunctional phenol which is phenol or a lower alkyl substituted phenol represented by the following general formula:

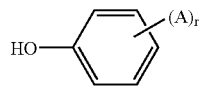

(wherein A represents a hydrogen atom, a linear or branched alkyl group having 1 to 9 carbon atoms or an aryl alkyl group, and r represents an integer of 1 to 5, preferably 1 to 3.)

Specific examples of the monofunctional phenol include phenol, p-t-butyl phenol, p-cumyl phenol and isooctyl phenol.

Further, other monofunctional phenols such as phenols and benzoic chloride having a long chain alkyl group or an aliphatic ester group as a substituent, and long chain alkyl carboxylic chlorides can also be used. When the terminals of the polycarbonate copolymer are blocked by use of these monofunctional phenols, they not only serve as a terminal blocking agent or a molecular weight adjuster but also improve the melt flowability of the resin thereby facilitating molding and also improve physical properties as a substrate. In particular, these monofunctional phenols have an effect of reducing the water absorption of the resin and are preferably used accordingly. These are represented by the following general formulae (III-1) to (III-8):

(III-1)

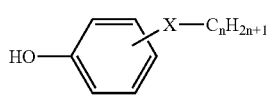

(III-2)

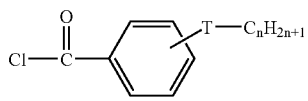

(III-3)

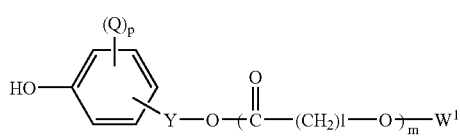

(III-4)

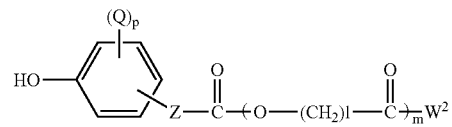

(III-5)

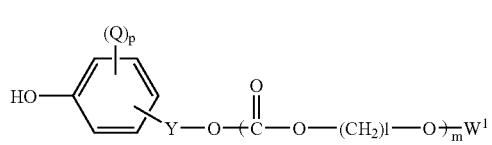

(III-6)

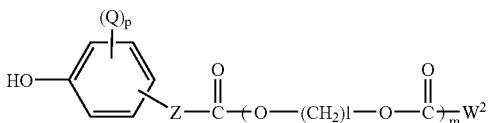

(III-7)

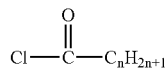

(III-8)

(wherein X is —R—O—, —R—CO—O— or —R—O—CO— wherein R represents a single bond or a divalent aliphatic hydrocarbon group having 1 to 10 carbon atoms, preferably 1 to 5 carbon atoms, T represents a single bond or the same bonds as the above X, and n represents an integer of 10 to 50.

Q represents a halogen atom or a monovalent aliphatic hydrocarbon group having 1 to 10 carbon atoms, preferably 1 to 5 carbon atoms, p represents an integer of 0 to 4, Y represents a divalent aliphatic hydrocarbon group having 1 to 10 carbon atoms, preferably 1 to 5 carbon atoms, and $W^1$ represents a hydrogen atom, —CO—$R^{13}$, —CO—O—$R^{14}$ or $R^{15}$ wherein $R^{13}$, $R^{14}$ and $R^{15}$ each represent a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms or a monovalent aromatic hydrocarbon group having 6 to 15 carbon atoms, preferably 6 to 12 carbon atoms.

l represents an integer of 4 to 20, preferably 5 to 10, m represents an integer of 1 to 100, preferably 3 to 60, particularly preferably 4 to 50, Z represents a single bond or a divalent aliphatic hydrocarbon group having 1 to 10 carbon atoms, preferably 1 to 5 carbon atoms, and $W^2$ represents a hydrogen atom, a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms or a monovalent aromatic hydrocarbon group having 6 to 15 carbon atoms, preferably 6 to 12 carbon atoms.

Of these, substituted phenols of (III-1) and (III-2) are preferred. As the substituted phenol of (III-1), one in which n is 10 to 30, particularly 10 to 26, is preferred. Specific examples thereof include decyl phenol, dodecyl phenol, tetradecyl phenol, hexadecyl phenol, octadecyl phenol, eicosyl phenol, docosyl phenol and triacontyl phenol.

Meanwhile, as the substituted phenol of the general formula (III-2), a compound in which X is —R—CO—O— and R is a single bond is appropriate, and a compound in which n is 10 to 30, particularly 10 to 26, is suitable. Specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

The position of a substituent in the substituted phenols or substituted benzoic chlorides represented by the above general formulae (III-1) to (III-7) is preferably the para or ortho position, and a mixture of both is preferred.

The above monofunctional phenols are desirably introduced to at least 5 mol %, preferably at least 10 mol % of all terminals of the obtained polycarbonate copolymer. Further, the monofunctional phenols may be used alone or in admixture of two or more.

Further, when 9,9-bis(4-hydroxy-3-methylphenyl)fluorene constitutes at least 80 mol % of all dihydric phenol components in the polycarbonate copolymer of the present invention, the flowability of the resin may deteriorate. For this reason, the substituted phenols or substituted benzoic chlorides represented by the above general formulae (III-1) to (III-7) are preferably used as a terminal blocking agent.

(Heat Stabilizers)

In the present invention, the above polycarbonate copolymer can contain at least one phosphorus compound selected from the group consisting of phosphoric acid, phosphorous acid, phosphonic acid, phosphonous acid and their esters in an amount of 0.0001 to 0.05 wt % based on the copolymer. By addition of the phosphorus compound, the thermal stability of the polycarbonate copolymer improves, and a decrease in molecular weight and deterioration in color at the time of molding can be prevented.

The phosphorus compound is at least one phosphorus compound selected from the group consisting of phosphoric acid, phosphorous acid, phosphonic acid, phosphonous acid and their esters and is preferably at least one phosphorus compound selected from the group consisting of the following general formulae (IV-1) to (IV-4):

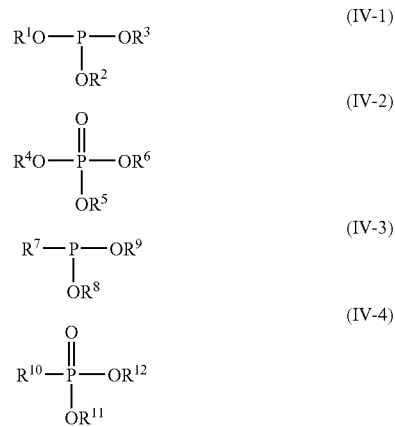

wherein $R^1$ to $R^{12}$ each independently represent a hydrogen atom, an alkyl group having 1 to 20 carbon atoms such as methyl, ethyl, propyl, isopropyl, butyl, isobutyl, t-butyl, pentyl, hexyl, heptyl, octyl, nonyl, decyl, dodecyl, hexadecyl or octadecyl, an aryl group having 6 to 15 carbon atoms such as phenyl, tolyl or naphthyl, or an aralkyl group having 7 to 18 carbon atoms such as benzyl or phenethyl.

Further, when two alkyl groups exist in one compound, the two alkyl groups may be bonded together to form a ring.

Illustrative examples of the phosphorus compound represented by the above formula (IV-1) include triphenyl phosphite, trisnonylphenyl phosphite, tris(2,4-di-t-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-t-butyl-4-methylphenyl)pentaerythritol diphosphite, 2,2-methylenebis(4,6-di-t-butylphenyl)octyl phosphite, bis(nonylphenyl) pentaerythritol diphosphite, bis(2,4-di-t-butylphenyl) pentaerythritol diphosphite, bis(2,4-dicumylphenyl) pentaerythritol diphosphite and distearyl pentaerythritol diphosphite.

Illustrative examples of the phosphorus compound represented by the above formula (IV-2) include tributyl phosphate, trimethyl phosphate, triphenyl phosphate, triethyl phosphate, diphenyl monoorthoxenyl phosphate, dibutyl phosphate, dioctyl phosphate and diisopropyl phosphate.

Illustrative examples of the phosphorus compound represented by the above formula (IV-3) include tetrakis(2,4-di-t-butylphenyl)-4,4-diphenylene phosphonite.

Illustrative examples of the phosphorus compound represented by the above formula (IV-4) include dimethyl benzenephosphonate, diethyl benzenephosphonate and dipropyl benzenephosphonate.

Of these, distearyl pentaerythritol diphosphite, triethyl phosphate, dimethyl benzenephosphonate and bis(2,4-dicumylphenyl)pentaerythritol diphosphite are preferably used.

The amount of the phosphorus compound is 0.0001 to 0.05 wt %, preferably 0.0005 to 0.02 wt %, particularly preferably 0.001 to 0.01 wt %, based on the polycarbonate copolymer. When the amount is smaller than 0.0001 wt %, the above effect is difficult to obtain, while when the amount is larger than 0.05 wt %, the phosphorus compound adversely affects the thermal stability of the polycarbonate copolymer, and hydrolysis resistance is also degraded disadvantageously.

(Antioxidant)

To the polycarbonate copolymer of the present invention, a generally known antioxidant can be added so as to prevent oxidation of the copolymer. Illustrative examples of the antioxidant include a phenol based antioxidant and a lactone based antioxidant. Specific examples of the phenol based antioxidant include triethylene glycol-bis(3-(3-t-butyl-5-methyl-4-hydroxyphenyl)propionate), 1,6-hexanediol-bis (3-(3,5-di-t-butyl-4-hydroxyphenyl)propionate), pentaerythritol-tetrakis(3-(3,5-di-t-butyl-4-hydroxyphenyl) propionate), octadecyl-3-(3,5-di-t-butyl-4-hydroxyphenyl) propionate, 1,3,5-trimethyl-2,4,6-tris(3,5-di-t-butyl-4-hydroxybenzyl)benzene, N,N-hexamethylene bis(3,5-di-t-butyl-4-hydroxy-hydrocinnamide), 3,5-di-t-butyl-4-hydroxy-benzylphosphonate-diethyl ester, tris(3,5-di-t-butyl-4-hydroxybenzyl)isocyanurate, and 3,9-bis{1,1-dimethyl-2-[β-(3-t-butyl-4-hydroxy-5-methyl phenyl) propionyloxy]ethyl}-2,4,8,10-tetraoxaspiro(5,5) undecane.

Further, specific examples of the lactone based antioxidant include 5,7-di-t-butyl-3-(3,4-dimethylphenyl)-3H-benzofuran-2-one, and 5,7-di-t-butyl-3-(2,3-dimethylphenyl)-3H-benzofuran-2-one.

The antioxidant is preferably added in an amount of 0.0001 to 0.05 wt % based on the polycarbonate copolymer.

(Mold Releasing Agent)

Further, to the polycarbonate copolymer of the present invention, a higher fatty acid ester of a monohydric or polyhydric alcohol can also be added as required. By addition of the higher fatty acid ester of a monohydric or polyhydric alcohol, the mold releasability of the above polycarbonate copolymer from a mold at the time of molding is improved, and in molding of an optical article, a molding load is low and deformation of a molded article by improper mold releasing can be prevented. Further, the addition of the higher fatty acid ester also has an advantage that the melt flowability of the polycarbonate copolymer is improved.

The higher fatty acid ester is preferably a partial ester or full ester of a monohydric or polyhydric alcohol having 1 to 20 carbon atoms and a saturated fatty acid having 10 to 30 carbon atoms.

Further, specific examples of the partial ester or full ester of the monohydric or polyhydric alcohol and the saturated fatty acid include monoglyceride stearate, monosorbitate stearate, monoglyceride behenate, pentaerythritol monostearate, pentaerythritol tetrastearate, propylene glycol monostearate, stearyl stearate, palmityl palmitate, butyl stearate, methyl laurate, isopropyl palmitate, and 2-ethylhexyl stearate. Of these, monoglyceride stearate and pentaerythritol tetrastearate are preferably used.

The amount of the ester of the alcohol and the higher fatty acid is 0.01 to 2 wt %, preferably 0.015 to 0.5 wt %, more preferably 0.02 to 0.2 wt %, based on the polycarbonate copolymer. When the amount is smaller than 0.01 wt %, the above effect is not obtained, while when the amount is larger than 2 wt %, the ester causes stains on the surface of a mold.

(Other Additives)

To the polycarbonate copolymer of the present invention, additives such as a light stabilizer, a coloring agent, an antistatic agent and a lubricant can also be added in such an amount that does not impair heat resistance and transparency. The above additives can be mixed into the polycarbonate copolymer of the present invention by a given method. For example, a mixing method using a tumbler, a V-shaped blender, a NAUTA mixer, a Banbury mixer, a kneading roller, an extruder or the like is used as appropriate.

EXAMPLES

Hereinafter, the present invention will be further described with reference to Examples. However, the present invention is not limited to these Examples. In Examples, "parts" mean "parts by weight".

Examples 1 to 3 and Comparative Example 1

Part for Reflow Soldering

Physical properties were evaluated by the following methods.

(1) Specific Viscosity

This is measured at a temperature of 20° C. after 0.7 g of polymer is dissolved in 100 ml of methylene chloride.

(2) Glass Transition Point (Tg)

This is measured at a temperature increasing rate of 20° C./min by use of the 2910 type DSC of TA INSTRUMENTS JAPAN CO., LTD.

(3) Melt-Volume Rate (MVR)

This is shown by a polymer amount ($cm^3$) flown out in 10 minutes at 320° C. under a load of 1.2 kg by use of the L251-11 type MFR measuring device of TECHNOL SEVEN CO., LTD. in accordance with JIS K-7210.

(4) Transmittance

The transmittance of a test piece prepared by injection molding and having a thickness of 1.0 mm, a width of 10 mm and a length of 20 mm at wavelengths of 400 nm, 500 nm, 600 nm, 700 nm, 1,300 nm, 1,400 nm, 1,500 nm and 1,600 nm is measured by use of the U-4001 type spectrophotometer of HITACHI, LTD.

(5) Reflow Heat Resistance a. Test Piece

A test, piece prepared by injection molding and having a thickness of 1.0 mm, a width of 10 mm and a length of 20 mm is dried under reduced pressure at 120° C. for 10 hours. This test piece is treated by a reflow furnace (product of Asahi Engineering Co., Ltd., TPF-20L) using both infrared light and hot air. The heating temperature pattern is set such that a peak temperature of 250° C. lasts for 5 seconds after heating at 150° C. for 60 seconds. When the molded piece after the reflow treatment is not deformed, it is evaluated as "○", and when it is deformed, it is evaluated as "×".

b. Lens

A flat convex lens prepared by injection molding and having an external diameter of 2.0 mm, a thickness at the center of 0.80 mm and a focal distance of 2.0 mm is dried under reduced pressure at 120° C. for 10 hours. This test piece is treated by a reflow furnace (product of Asahi Engineering Co., Ltd., TPF-20L) using both infrared light and hot air. The heating temperature pattern is set such that a peak temperature of 250° C. lasts for 5 seconds after heating at 150° C. for 60 seconds. When the amount of change in the focal distance of the flat convex lens after the reflow treatment is smaller than 0.10 mm, it is evaluated as "○", and when the amount of change is 0.10 mm or larger or the lens is deformed, it is evaluated as "×".

Example 1

(Polymerization)

To a reactor equipped with a thermometer, agitator and reflux condenser, 2,270 parts of ion exchange water and 444 parts of 48% sodium hydroxide aqueous solution were added, and 76.8 parts of bisphenol A, 509.1 parts of 9,9-bis (4-hydroxy-3-methylphenyl)fluorene (hereinafter may be abbreviated as "biscresolfluorene") and 1.2 parts of hydrosulfite were then dissolved. Then, after 1,430 parts of methylene chloride was added, 225 parts of phosgene was blown into the mixture at 18 to 23° C. in 60 minutes under agitation. After completion of the blowing of phosgene, 11.4 parts of p-t-butyl phenol and 6.9 parts of 48% sodium hydroxide aqueous solution were added, and the resulting mixture was agitated at 25 to 30° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 600 parts of whitish yellow polymer having a molar ratio of bisphenol A/biscresolfluorene of 20:80, a specific viscosity of 0.244 and a Tg of 223° C. was obtained (yield: 95%).

(Molding)

To this polycarbonate resin powder, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the mixture was pelletized by use of a vented φ30-mm twin screw extruder and then injection molded into a molded piece having a thickness of 1.0 mm, a width of 10 mm and a length of 20 mm by use of the N-20C injection molding machine of Japan Steel Works, LTD. at a cylinder temperature of 340° C. and a mold temperature of 150° C. The transmittance of the molded piece was measured, and reflow heat resistance thereof was tested. The results are shown in Table 1.

(Lens)

Further, a flat convex lens having an external diameter of 2.0 mm, a thickness at the center of 0.80 mm and a focal distance of 2.0 mm was injection molded from the above pellet by use of the N-20C injection molding machine of Japan Steel Works, LTD. at a cylinder temperature of 340°

C. and a mold temperature of 150° C. The transmittance of the lens was measured, and reflow heat resistance thereof was tested. The results are shown in Table 1.

Example 2

(Polymerization)

To a reactor equipped with a thermometer, agitator and reflux condenser, 2,060 parts of ion exchange water and 404 parts of 48% sodium hydroxide aqueous solution were added, and 111.6 parts of bisphenol A, 431.7 parts of 9,9-bis(4-hydroxy-3-methylphenyl)fluorene (hereinafter may be abbreviated as "biscresolfluorene") and 1.1 parts of hydrosulfite were then dissolved. Then, after 1,390 parts of methylene chloride was added, 210 parts of phosgene was blown into the mixture at 18 to 23° C. in 60 minutes under agitation. After completion of the blowing of phosgene, 11.0 parts of p-t-butyl phenol and 6.7 parts of 48% sodium hydroxide aqueous solution were added, and the resulting mixture was agitated at 25 to 30° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 560 parts of whitish yellow polymer having a molar ratio of bisphenol A/biscresolfluorene of 30:70, a specific viscosity of 0.258 and a Tg of 216° C. was obtained (yield: 94%).

(Molding)

To this polycarbonate resin powder, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the mixture was pelletized by use of a vented φ30-mm twin screw extruder and then injection molded into a molded piece having a thickness of 1.0 mm, a width of 10 mm and a length of 20 mm by use of the N-20C injection molding machine of Japan Steel Works, LTD. at a cylinder temperature of 330° C. and a mold temperature of 140° C. The transmittance of the molded piece was measured, and reflow heat resistance thereof was tested. The results are shown in Table 1.

(Lens)

Further, a flat convex lens having an external diameter of 2.0 mm, a thickness at the center of 0.80 mm and a focal distance of 2.0 mm was injection molded from the above pellet by use of the N-20C injection molding machine of Japan Steel Works, LTD. at a cylinder temperature of 330° C. and a mold temperature of 140° C. The transmittance of the lens was measured, and reflow heat resistance thereof was tested. The results are shown in Table 1.

Example 3

(Polymerization)

621 parts of whitish yellow polymer having a molar ratio of bisphenol A/biscresolfluorene of 15:85, a specific viscosity of 0.240 and a Tg of 232° C. was obtained (yield: 94%) in the same manner as in Example 1 except that the amount of bisphenol A used in Example 1 was changed to 57.6 parts and that the amount of biscresolfluorene used in Example 1 was changed to 540.9 parts.

(Molding)

To this polycarbonate resin powder, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the mixture was pelletized by use of a vented φ30-mm twin screw extruder and then injection molded into a molded piece having a thickness of 1.0 mm, a width of 10 mm and a length of 20 mm by use of the N-20C injection molding machine of Japan Steel Works, LTD. at a cylinder temperature of 350° C. and a mold temperature of 165° C. The transmittance of the molded piece was measured, and reflow heat resistance thereof was tested. The results are shown in Table 1.

(Lens)

Further, a flat convex lens having an external diameter of 2.0 mm, a thickness at the center of 0.80 mm and a focal distance of 2.0 mm was injection molded from the above pellet by use of the N-20C injection molding machine of Japan Steel Works, LTD. at a cylinder temperature of 350° C. and a mold temperature of 165° C. The transmittance of the lens was measured, and reflow heat resistance thereof was tested. The results are shown in Table 1.

Comparative Example 1

(Polymerization)

To a reactor equipped with a thermometer, agitator and reflux condenser, 2,270 parts of ion exchange water and 444 parts of 48% sodium hydroxide aqueous solution were added, and 7.68 parts of bisphenol A, 623.6 parts of biscresolfluorene and 1.2 parts of hydrosulfite were then dissolved. Then, after 2,000 parts of chloroform was added, 225 parts of phosgene was blown into the mixture at 18 to 23° C. in 60 minutes under agitation. After completion of the blowing of phosgene, 10.1 parts of p-t-butyl phenol and 6.9 parts of 48% sodium hydroxide aqueous solution were added, and the resulting mixture was agitated at 25 to 30° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 637 parts of whitish yellow polymer having a molar ratio of bisphenol A/biscresolfluorene of 2:98, a specific viscosity of 0.245 and a Tg of 238° C. was obtained (yield: 93%).

(Molding)

To this polycarbonate resin powder, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the mixture was pelletized by use of a vented φ30-mm twin screw extruder and then injection molded into a molded piece having a thickness of 1.0 mm, a width of 10 mm and a length of 20 mm by use of the N-20C injection molding machine of Japan Steel Works, LTD. at a cylinder temperature of 360° C. and a mold temperature of 170° C. The transmittance of the molded piece was measured, and reflow heat resistance thereof was tested. The results are shown in Table 1.

(Lens)

Further, a flat convex lens having an external diameter of 2.0 mm, a thickness at the center of 0.80 mm and a focal distance of 2.0 mm was injection molded from the above pellet by use of the N-20C injection molding machine of Japan Steel Works, LTD. at a cylinder temperature of 360° C. and a mold temperature of 170° C. The transmittance of the lens was measured, and reflow heat resistance thereof was tested. The results are shown in Table 1.

TABLE 1

|  |  | Unit | Ex. 1 | Ex. 2 | Ex. 3 | C. Ex. 1 |
|---|---|---|---|---|---|---|
| Composition Ratio (mol %) | Biscresolfluorene |  | 80 | 70 | 85 | 98 |
|  | Bisphenol A |  | 20 | 30 | 15 | 2 |
| Results of Evaluations | MVR | cm³/10 min | 1.5 | 2.5 | 0.6 | 0.1 |
|  | Transmittance 400 nm | % | 68.9 | 68.5 | 66.6 | 58.9 |
|  | 500 nm | % | 80.2 | 80.5 | 80.2 | 78.0 |
|  | 600 nm | % | 82.3 | 82.5 | 81.8 | 81.2 |
|  | 700 nm | % | 84.0 | 84.6 | 84.0 | 83.3 |
|  | 1,300 nm | % | 88.5 | 88.7 | 87.9 | 87.6 |
|  | 1,400 nm | % | 81.7 | 81.5 | 81.8 | 81.4 |
|  | 1,500 nm | % | 86.5 | 86.7 | 86.3 | 85.0 |
|  | 1,600 nm | % | 84.3 | 84.3 | 84.5 | 83.9 |
|  | Reflow Heat Resistance | Test Piece | ○ | ○ | ○ | ○ |
|  |  | Lens | ○ | ○ | ○ | ○ |

Ex.: Example,
C. Ex.: Comparative Example

Examples 4 to 18 and Comparative Examples 2 to 7

Light Path Converting Part

Physical properties were evaluated by the following methods.

(1) Specific Viscosity

This is measured at a temperature of 20° C. after 0.7 g of polymer is dissolved in 100 ml of methylene chloride.

(2) Glass Transition Point (Tg)

This is measured at a temperature increasing rate of 20° C./min by use of the 2910 type DSC of TA INSTRUMENTS JAPAN CO., LTD.

(3) 5% Weight Reduction Temperature (Td)

This is measured at a temperature increasing rate of 20° C./min by use of the 2950 type TGA of TA INSTRUMENTS JAPAN CO., LTD.

(4) Photoelastic Coefficient

This is measured by use of the photoelasticity measuring device PA-150 of Riken Keiki-Co., Ltd.

(5) Transmittance ($T_{550}$)

The transmittance at 550 nm of a prepared molded plate is measured by use of the U-4001 type spectrophotometer of Hitachi, Ltd.

(6) Retardation ($Re_{550}$)

The retardation at 550 nm of a prepared molded plate is measured by use of the M-220 type ellipsometer of JASCO Corporation.

(Polymerization)

EX-PC1

To a reactor equipped with a thermometer, agitator and reflux condenser, 2,050 parts of ion exchange water and 434 parts of 48% sodium hydroxide aqueous solution were added, and 111.6 parts of bisphenol A (hereinafter may be abbreviated as "BPA"), 431.7 parts of 9,9-bis(4-hydroxy-3-methylphenyl)fluorene (hereinafter may be abbreviated as "BCF") and 1.1 parts of hydrosulfite were dissolved. Then, after 1,360 parts of methylene chloride was added, 215 parts of phosgene was blown into the mixture at 18 to 23° C. in 60 minutes under agitation. After completion of the blowing of phosgene, 11.0 parts of p-t-butyl phenol and 67 parts of 48% sodium hydroxide aqueous solution were added, and the resulting mixture was agitated at 25 to 30° C. for 45 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 550 parts of whitish yellow polymer powder having a molar ratio of BPA/BCF of 30:70, a specific viscosity of 0.260 and a Tg of 215° C. was obtained (yield: 92%).

EC-PC2

To a reactor equipped with a thermometer, agitator and reflux condenser, 3,608 parts of ion exchange water and 482 parts of 48% sodium hydroxide aqueous solution were added, and 156.1 parts of 1,3-bis{2-(4-hydroxyphenyl)propyl}benzene (hereinafter may be abbreviated as "BPM"), 461.0 parts of BCF and 1.3 parts of hydrosulfite were then dissolved. Then, after 1,704 parts of methylene chloride was added, 215 parts of phosgene was blown into the mixture at 18 to 23° C. in 60 minutes under agitation. After completion of the blowing of phosgene, 12.5 parts of p-t-butyl phenol and 69 parts of 48% sodium hydroxide aqueous solution were added, and the resulting mixture was agitated at 25 to 30° C. for 45 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 619 parts of whitish yellow polymer powder having a molar ratio of BPM/BCF of 27:73, a specific viscosity of 0.260 and a Tg of 212° C. was obtained (yield: 92%).

EX-PC3

560 parts of whitish yellow polymer having a molar ratio of BPA/BCF of 33:67, a specific viscosity of 0.262 and a Tg of 212° C. was obtained (yield: 94%) in the same manner as in production of EX-PC1 except that the amount of BPA used in the production of EX-PC1 was changed to 124.4 parts and that the amount of BCF used in the production of EX-PC1 was changed to 418.9 parts.

EX-PC4

630 parts of whitish yellow polymer having a molar ratio of BPM/BCF of 45:55, a specific viscosity of 0.280 and a Tg of 190° C. was obtained (yield: 95%) in the same manner as in production of EX-PC2 except that the amount of BPM used in the production of EX-PC2 was changed to 260.1 parts and that the amount of BCF used in the production of EX-PC2 was changed to 347.3 parts.

EX-PC5

595 parts of whitish yellow polymer having a molar ratio of BPA/BCF of 20:80, a specific viscosity of 0.250 and a Tg of 220° C. was obtained (yield: 94%) in the same manner as in the production of EX-PC1 except that the amount of BPA used in the production of EX-PC1 was changed to 79.3 parts and that the amount of BCF used in the production of EX-PC1 was changed to 504.6 parts.

CEX-PC1

584 parts of whitish yellow BPA homopolymer having a specific viscosity of 0.280 and a Tg of 144° C. was obtained (yield: 95%) in the same manner as in the production of EX-PC1 except that the amount of BPA used in the production of EX-PC1 was changed to 605.3 parts, BCF was not added and the amount of p-t-butyl phenol was changed to 13.0 parts.

CEX-PC2

40 parts of polycarbonate resin comprising, as an aromatic dihydroxy component, bis(4-hydroxy-3,5-dimethylphenyl)propane having a specific viscosity of 0.550 and 60 parts of acrylonitrile-styrene copolymer having a weight average molecular weight of 100,000 and copolymerized with 10% of acrylonitrile component were dry blended by use of a tumbler.

Examples 4 to 8 and Comparative Examples 2 and 3

(Molded Piece)

To the prepared resins, 0.050% of bis(2,4-dicumylphenyl) pentaerythritol diphosphite and 0.10% of pentaerythritol tetrastearate were added, and the resulting mixtures were pelletized by use of a vented ϕ30-mm single screw extruder and then injection molded into molded plates each having a thickness of 1.0 mm, a width of 1.0 mm and a length of 2.0 mm under molding conditions shown in Table 2 by use of the N-20C injection molding machine of Japan Steel Works, LTD. The transmittances and retardations of the molded plates were measured. The results are shown in Table 2.

TABLE 2

| | | Composition Ratio | | | Evaluation Results | | | Molding Conditions | | Evaluation Results | |
|---|---|---|---|---|---|---|---|---|---|---|---|
| | PC | | | | | | Photoelastic | Cylinder | Mold | | |
| Item | Resins | BCF | BPA | BPM | Tg | Td | Coefficient | Temperature | Temperature | $T_{550}$ | $Re_{550}$ |
| Unit | — | mol % | mol % | mol % | ° C. | ° C. | $\times 10^{13}$ cm$^2$/dyne | ° C. | ° C. | % | nm |
| Ex. 4 | EX-PC1 | 70 | 30 | | 215 | 495 | 38 | 350 | 140 | 89 | 1.5 |
| Ex. 5 | EX-PC2 | 73 | | 27 | 212 | 482 | 30 | 350 | 140 | 88 | 1.2 |
| Ex. 6 | EX-PC3 | 67 | 33 | | 212 | 497 | 39 | 350 | 140 | 89 | 1.3 |
| Ex. 7 | EX-PC4 | 55 | | 45 | 165 | 490 | 40 | 320 | 125 | 88 | 7.3 |
| Ex. 8 | EX-PC5 | 80 | 20 | | 220 | 485 | 35 | 350 | 140 | 89 | 5.4 |
| C. Ex. 2 | CEX-PC1 | | 100 | | 144 | 497 | 80 | 300 | 115 | 90 | 72 |
| C. Ex. 3 | CEX-PC2 | | | | 129 | 403 | 18 | 270 | 90 | 88 | 9.6 |

Ex.: Example,
C. Ex.: Comparative Example

Examples 9 to 13 and Comparative Examples 4 and 5

(Lens)

To the prepared resins, 0.050% of bis(2,4-dicumylphenyl) pentaerythritol diphosphite and 0.10% of pentaerythritol tetrastearate were added, and the mixtures were pelletized by use of a vented ϕ30-mm single screw extruder and then injection molded into flat convex lenses each having an external diameter of 2.0 mm, a thickness at the center of 0.80 mm and a focal distance of 2.0 mm under molding conditions shown in Table 3 by use of the N-20C injection molding machine of Japan Steel Works, LTD.

At the front and back of the molded flat convex lens, polarizing plates whose phase differences were shifted by 90° were disposed. White light was irradiated to one of the polarizing plates, and interference color appearing on the flat convex lens was observed visually so as to evaluate the degree of birefringence based on the following criteria.

◎: No interference stripes
○: One interference stripe
×: Two or more interference stripes The results of molding and evaluation are shown in Table 3.

TABLE 3

| Item Unit | PC Resins | Composition Ratio | | | Molding Conditions | | Evaluation Results | |
|---|---|---|---|---|---|---|---|---|
| | | BCF mol % | BPA mol % | BPM mol % | Cylinder Temperature °C. | Mold Temperature °C. | Moldability % | Birefringence ⊚/○/X |
| Ex. 9 | EX-PC1 | 70 | 30 | | 350 | 140 | No Problem | ⊚ |
| Ex. 10 | EX-PC2 | 73 | | 27 | 350 | 140 | No Problem | ⊚ |
| Ex. 11 | EX-PC3 | 67 | 33 | | 350 | 140 | No Problem | ⊚ |
| Ex. 12 | EX-PC4 | 55 | | 45 | 320 | 125 | No Problem | ○ |
| Ex. 13 | EX-PC5 | 80 | 20 | | 350 | 140 | No Problem | ○ |
| C. Ex. 4 | CEX-PC1 | | 100 | | 320 | 115 | No Problem | X |
| C. Ex. 5 | CEX-PC2 | | | | 300 | 100 | Large Amount of Cracked Gas, Difficult to Mold | X |

Ex.: Example,
C. Ex.: Comparative Example

Examples 14 to 18 and Comparative Examples 6 and 7

(Prism)

To the prepared resins, 0.030% of bis(2,4-dicumylphenyl) pentaerythritol diphosphite and 0.15% of pentaerythritol tetrastearate were added, and the mixtures were pelletized by use of a vented φ30-mm single screw extruder and then injection molded into rectangular prisms each having a size of 20.0 mm×28.3 mm×20.0 mm under molding conditions shown in Table 4 by use of the N-20C injection molding machine of Japan Steel Works, LTD.

At the front and back of the molded prism, polarizing plates whose phase differences were shifted by 90° were placed. White light was irradiated to one of the polarizing plates, and interference color appearing on the prism was observed visually so as to evaluate the degree of birefringence based on the following criteria.
⊚: No interference stripes
○: One interference stripe
x: Two or more interference stripes Examples 19 to 23 and Comparative Examples 8 and 9

Optical Disk

Physical properties were evaluated by the following methods.

(1) Deflection Temperature under Load

This is measured under a load of 1.81 MPa in accordance with ISO75-1, -2.

(2) Saturated Water Absorption

A polymer is immersed in pure water at 23° C., and saturated water absorption when an amount of change in a day reaches 0.01% or lower is measured in accordance with ISO62.

(3) Flexural Modulus

After a pellet is dried at 120° C. for 5 hours, it is injection molded into a test piece at a cylinder temperature of 290° C. by use of an injection molding machine (SG-150 of Sumitomo Heavy Industries, Ltd.). The flexural modulus of the test piece is measured in accordance with ISO178.

TABLE 4

| Item Unit | PC Resins | Composition Ratio | | | Molding Conditions | | Evaluation Results | |
|---|---|---|---|---|---|---|---|---|
| | | BCF mol % | BPA mol % | BPM mol % | Cylinder Temperature °C. | Mold Temperature °C. | Moldability % | Birefringence ⊚/○/X |
| Ex. 14 | EX-PC1 | 70 | 30 | | 360 | 150 | No Problem | ⊚ |
| Ex. 15 | EX-PC2 | 73 | | 27 | 360 | 150 | No Problem | ⊚ |
| Ex. 16 | EX-PC3 | 67 | 33 | | 360 | 150 | No Problem | ⊚ |
| Ex. 17 | EX-PC4 | 55 | | 45 | 360 | 130 | No Problem | ○ |
| Ex. 18 | EX-PC5 | 80 | 20 | | 365 | 155 | No Problem | ○ |
| C. Ex. 6 | CEX-PC1 | | 100 | | 350 | 125 | No Problem | X |
| C. Ex. 7 | CEX-PC2 | | | | 300 | 110 | Large Amount of Cracked Gas, Difficult to Mold | X |

Ex.: Example,
C. Ex.: Comparative Example (4) Initial Mechanical Properties

A disk substrate having a diameter of 120 mm and a thickness of 1.2 mm was injection molded from each pellet by use of M35B-D-DM of MEIKI CO., LTD. Table 5 shows molding conditions for each substrate. Thereafter, on the disk substrate obtained by injection molding, a reflective film, a dielectric layer 1, a phase change recording film and a dielectric layer 2 are deposited by sputtering, and a thin polycarbonate film cover layer is laminated thereon so as to obtain an optical disk substrate of interest.

Then, spacers are inserted between the disks so as to prevent the disks from contacting with each other, and the resulting disks are left to stand at a temperature of 23° C. and a humidity of 50% RH at least for two days. Tilt (initial substrate shape) is evaluated by the three dimensional shape measuring equipment DLD-3000U of Japan EM Co., Ltd. when a change in tilt with respect to thermal contraction and an environmental change is stabilized, and it is taken as initial mechanical properties.

(5) ΔTilt

After a disk substrate whose initial mechanical properties has been evaluated is exposed to an environment (environment A) where the temperature is 30° C. and the humidity is 90% RH until reaching saturated water absorption, the disk substrate is transferred to an environment (environment B) where the temperature is 23° C. and the humidity is 50% RH. After the transfer, a tilt change at 58 mm from the center which occurs due to the change of the environment is measured with time by the three dimensional shape measuring equipment DLD-3000U of Japan EM Co., Ltd. The difference between the maximum value of the tilt change and a value at which the tilt change is settled is taken as ΔTilt.

(6) Damping (tan δ)

This is measured at 40° C. and 18 Hz by use of RDAII of REOMETRICS CO., LTD. in accordance with ISO 6721-4.

Example 19

(Polymerization)

To a reactor equipped with a thermometer, agitator, reflux condenser and phosgene blowing tube, 31,500 parts of ion exchange water and 1,730 parts of sodium hydroxide were added, and 2,040 parts of 9,9-bis(3-methyl-4-hydroxyphenyl)fluorene (hereinafter may be abbreviated as "BCF"), 2,802 parts of 4,4'-(m-phenylenediisopropylidene)diphenol (hereinafter may be abbreviated as "BPM") and 10 parts of hydrosulfite were dissolved. Then, after 13,770 parts of methylene chloride was added, 1,670 parts of phosgene was blown into the mixture at 16 to 18° C. in 60 minutes under agitation. After completion of the blowing of phosgene, 81 parts of p-t-butyl phenol and 178 parts of sodium hydroxide were added, 4 parts of triethylamine was further added, and the resulting mixture was agitated at 30° C. for 1 hour, thereby completing the reaction. After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby white powder having a molar ratio of BCF/BPM of 40:60 was obtained. This powder had a specific viscosity of 0.283.

To this powder, 0.003 parts of tris(2,4-di-t-butylpyhenyl) phosphite, 0.005 parts of trimethyl phosphate and 0.045 parts of monoglyceride stearate were added based on 100 parts of the powder. Then, the powder was melt-kneaded by use of a vented twin screw extruder (KTX-46 of Kobe Steel, Ltd.) at a cylinder temperature of 260° C. while being deaerated, pelletized, and then injection molded into a disk substrate having a diameter of 120 mm and a thickness of 1.2 mm by use of M35-D-DM of MEIKI CO., LTD.

(Optical Disk)

On the disk substrate, a reflective film, a first dielectric layer, a phase change recording film and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Example 20

(Polymerization)

White powder having a molar ratio of BCF/BPM of 35:65 was obtained in the same manner as in Example 19 except that blowing of phosgene was carried out by use of 1,814 parts of BCF used in Example 19 and 3,084 parts of BPM used in Example 19 and 86 parts of p-t-butyl phenol was added after the blowing of phosgene. This powder had a specific viscosity of 0.283.

To this powder, the same additives as used in Example 19 were added in the same amounts as used in Example 19, and the resulting mixture was melt-kneaded and pelletized in the same manner as in Example 19. Then, the pellet was injection molded in the same manner as in Example 19 so as to obtain an optical disk.

(Optical Disk)

On the disk substrate, a reflective film, a first dielectric layer, a phase change recording film and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Example 21

(Polymerization)

White powder having a molar ratio of BCF/BPM of 50:50 was obtained in the same manner as in Example 19 except that blowing of phosgene was carried out by use of 2,277 parts of BCF used in Example 19 and 2,084 parts of BPM used in Example 19 and 74 parts of p-t-butyl phenol was added after the blowing of phosgene. This powder had a specific viscosity of 0.263.

To this powder, the same additives as used in Example 19 were added in the same amounts as used in Example 19, and the resulting mixture was melt-kneaded and pelletized in the same manner as in Example 19. Then, the pellet was injection molded in the same manner as in Example 19 so as to obtain a disk substrate.

(Optical Disk)

On the disk substrate, a reflective film, a first dielectric layer, a phase change recording layer and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Example 22

(Polymerization)

White powder having a molar ratio of BCF/BPM/THPE of 40:60:0.5 was obtained in the same manner as in Example 19 except that 23 parts of THPE and 81 parts of p-t-butyl phenol were added after blowing of phosgene in Example 19. This powder had a specific viscosity of 0.283.

To this powder, the same additives as used in Example 19 were added in the same amounts as used in Example 19, and the resulting mixture was melt-kneaded and pelletized in the same manner as in Example 19. Then, the pellet was injection molded in the same manner as in Example 19 so as to obtain a disk substrate.

(Optical Disk)

On the disk substrate, a reflective film, a first dielectric layer, a phase change recording layer and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Example 23

(Polymerization)

White powder having a molar ratio of BCF/BPC of 40:60 was obtained in the same manner as in Example 19 except that blowing of phosgene was carried out by use of 2,277 parts of BCF used in Example 19 and 2,313 parts of 2,2-bis(3-methyl-4-hydroxyphenyl)propane (hereinafter may be abbreviated as "BPC") in place of BPM used in Example 19 and 72 parts of p-t-butyl phenol was added after the blowing of phosgene. This powder had a specific viscosity of 0.279.

To this powder, the same additives as used in Example 19 were added in the same amounts as used in Example 19, and the resulting mixture was melt-kneaded and pelletized in the same manner as in Example 19. Then, the pellet was injection molded in the same manner as in Example 19 so as to obtain a disk substrate.

(Optical Disk)

On the disk substrate, a reflective film, a first dielectric layer, a phase change recording layer and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Comparative Example 8

(Polymerization)

4,750 parts of colorless polymer was obtained in the same manner as in Example 19 except that only 4,320 parts of bisphenol A (BPA) was used as a dihydroxy component. This powder had a specific viscosity of 0.289.

To this powder, the same additives as used in Example 19 were added in the same amounts as used in Example 19, and the resulting mixture was melt-kneaded and pelletized in the same manner as in Example 19. Then, the pellet was injection molded in the same manner as in Example 19 so as to obtain a disk substrate.

(Optical Disk)

On the disk substrate, a reflective film, a first dielectric layer, a phase change recording layer and a second dielectric layer were deposited in turn by sputtering, and a thin polycarbonate film cover layer was laminated thereon so as to obtain an optical disk of interest. The initial mechanical properties, ΔTilt and damping of the disk substrate were evaluated. The results of the evaluations are shown in Table 5.

Comparative Example 9

A disk substrate having a diameter of 120 mm and a thickness of 1.2 mm was injection molded from a polymethyl methacrylate (VLD-100) of Rohm & Haas Japan Co., Ltd. by use of M35B-D-DM of MEIKI CO., LTD. On the disk substrate, a reflective film, a first dielectric layer, a phase change recording layer and a second dielectric layer were deposited in turn by sputtering, and a thin polycarbonate film cover layer was then laminated thereon so as to obtain an optical disk of interest.

The initial mechanical properties, ΔTilt and damping of the disk substrate were evaluated. The results of the evaluations are shown in Table 5.

As shown in Table 5, the resins shown in Examples 19 to 23 can reduce saturated water absorption to 0.3% or lower and ΔTilt to 0.5 or smaller. In addition, they also have sufficiently high flexural moduli and tan δ, surface swing occurring when the molded optical disks spin at high speed can be kept small.

PC-A of Comparative Example 8 has low rigidity and tan δ. Hence, surface swing occurring when the optical disk spins at high speed is severe. Further, since it also has higher saturated water absorption than Examples, its ΔTilt is large.

PMMA of Comparative Example 9 has a high saturated water absorption of 2.0% or higher. Thus, its ΔTilt is very large as 5.0 or higher, and it has been therefore found that it is not suitable for practical use.

TABLE 5

|  |  |  | Ex. 19 | Ex. 20 | Ex. 21 | Ex. 22 | Ex. 23 | C. Ex. 8 | C. Ex. 9 |
|---|---|---|---|---|---|---|---|---|---|
| Composition | BCF | Component a | 40 | 35 | 50 | 40 | 40 | — | — |
| Ratio | Bisphenol Fluorene |  | — | — | — | — | — | — | — |
| (mol %) | BPM | Component b | 60 | 65 | 50 | 60 | — | — | — |
|  | BPC | Component b | — | — | — | — | 60 | — | — |
|  | THPE |  | — | — | — | 0.5 | — | — | — |
|  | BPA |  |  |  |  |  |  | 100 |  |
|  | PMMA |  | — | — | — | — | — | — | 100 |

TABLE 5-continued

| | | | Ex. 19 | Ex. 20 | Ex. 21 | Ex. 22 | Ex. 23 | C. Ex. 8 | C. Ex. 9 |
|---|---|---|---|---|---|---|---|---|---|
| Results of Evaluations of Resins | Specific Viscosity | | — | 0.283 | 0.284 | 0.274 | 0.283 | 0.279 | 0.289 | — |
| | Deflection Temperature under Load | (° C.) | 134 | 129 | 149 | 134 | 145 | 126 | 89 |
| | tanδ | — | 0.039 | 0.037 | 0.042 | 0.039 | 0.032 | 0.007 | 0.078 |
| | Flexural Modulus | (MPa) | 3,100 | 3,040 | 3,170 | 3,170 | 2,910 | 2,400 | 3,630 |
| | Saturated Water Absorption | wt % | 0.26 | 0.26 | 0.23 | 0.25 | 0.22 | 0.37 | 2.00 |
| Results of Evaluations of Disks | Cylinder Temperature | (° C.) | | | | 320 | | | |
| | Mold Tightening Force | ton | | | | 32 | | | |
| | Mold Temperature | (° C.) | 127 | 122 | 140 | 126 | 136 | 119 | 81 |
| | Initial Substrate Shape | (degree) | 0.20 | 0.20 | 0.20 | 0.20 | 0.20 | 0.20 | 0.36 |
| | ΔTilt | (degree) | 0.46 | 0.46 | 0.42 | 0.46 | 0.43 | 0.78 | 5.00 or Larger |

Ex.: Example,
C. Ex.: Comparative Example

Examples 24 to 31 and Comparative Examples 10 to 13

Plastic Mirror

Physical properties were measured by the following methods.

(1) Specific Viscosity: This is measured at a temperature of 20° C. after 0.7 g of polymer is dissolved in 100 ml of methylene chloride.
(2) Glass Transition Point (Tg): This is measured at a temperature increasing rate of 10° C./min by use of the 2910 type DSC of TA INSTRUMENTS JAPAN CO., LTD.
(3) Water Absorption: Water absorption after immersed in water at 23° C. for 24 hours is measured in accordance with ISO62.
(4) Flexural Modulus: The flexural modulus of a test piece prepared by drying a pellet at 120° C. for 5 hours and then subjecting the pellet to injection molding at a cylinder temperature of 300° C. by use of an injection molding machine (SG-150 of Sumitomo Heavy Industries, Ltd.) is measured in accordance with ISO178.
(5) Degree of Warpage: A disk substrate having a diameter of 120 mm and a thickness of 1.2 mm is injection molded by use of M35B-D-DM of MEIKI CO., LTD. Thereafter, an aluminum film is deposited on one surface of the substrate. After the disk substrate is exposed to an environment (environment A) where the temperature is 30° C. and the humidity is 90% RH until reaching saturated water absorption, the disk substrate is transferred to an environment (environment B) where the temperature is 23° C. and the humidity is 50% RH. After the transfer, a tilt change at 58 mm from the center which occurs due to the change of the environment is measured with time by use of the three dimensional shape measuring device DLD-3000U of Japan EM Co., Ltd. The difference between the maximum value of the tilt change and a value at which the tilt change is settled is taken as ΔTilt.
(6) Mold Printability: The surface roughness of a molded substrate is measured by use of SURFCORDER SE1100 of Kosaka laboratory Ltd.

Example 24

(Polymerization)

To a reactor equipped with a thermometer and agitator, 19,580 parts of ion exchange water and 3,850 parts of 48.5% sodium hydroxide aqueous solution were added, and 1,175 parts of BCF, 2,835 parts of 2,2-bis(4-hydroxyphenyl)propane (hereinafter may be abbreviated as "BPA") and 9 parts of hydrosulfite were then dissolved. Then, after 13,210 parts of methylene chloride was added, 2,000 parts of phosgene was blown into the mixture at 15° C. in about 40 minutes under vigorous agitation so as to cause a reaction. After completion of the blowing of phosgene, the temperature was raised to 28° C., and 94 parts of p-t-butyl phenol and 640 parts of sodium hydroxide were added so as to cause emulsification. Then, 6 parts of triethylamine was added, and the resulting mixture was continuously agitated for 1 hour, thereby completing the reaction.

After completion of the reaction, the organic phase was separated, diluted with methylene chloride, washed with water, made acidic by hydrochloric acid and then washed with water. When the electric conductivity of the water phase became nearly the same as that of ion exchange water, methylene chloride was evaporated by a kneader. Thereby, 4,080 parts of colorless powder having a molar ratio of BCF/PCA of 20:80 was obtained. This powder had a specific viscosity of 0.285 and a Tg of 172° C.

(Molding)

To this powder, 0.003 parts of tris(2,4-di-t-butylpyhenyl) phosphite, 0.005 parts of trimethyl phosphate and 0.045 parts of monoglyceride stearate were added based on 100 parts of the powder. Then, the powder was melt-kneaded by use of a vented twin screw extruder (KTX-46 of Kobe Steel, Ltd.) at a cylinder temperature of 280° C. while being deaerated, pelletized, and then injection molded into a disk substrate having a diameter of 120 mm and a thickness of 1.2 mm by use of M35B-D-DM of MEIKI CO., LTD. The substrate had a sufficiently smooth surface so as to be used for a plastic mirror.

Further, on the substrate, aluminum was deposited to a thickness of 50 nm by use of the EKC-1 Ion Plating apparatus of Sumitomo Heavy Industries, Ltd. The maximum warpage of the aluminum deposited substrate by absorption of water was 0.9 deg. Further, the substrate also showed a water absorption of 0.170 wt % and a flexural modulus of 2,700 MPa.

Example 25

(Polymerization)

4,830 parts of colorless powder having a molar ratio of BCF/BPA of 50:50 was obtained in the same manner as in Example 24 except that 2,937 parts of BCF, 1,772 parts of BPA and 84 parts of p-t-butyl phenol were used. This powder had a specific viscosity of 0.278 and a Tg of 195° C.

(Molding)

To this powder, the same additives as used in Example 24 were added in the same amounts as used in Example 24, and the resulting mixture was melt-kneaded and pelletized in the same manner as in Example 24 except that the cylinder temperature was 300° C. Then, this pellet was injection molded in the same manner as in Example 24 so as to obtain a substrate. The substrate had a sufficiently smooth surface so as to be used for a plastic mirror.

On the substrate, aluminum was deposited. The maximum warpage of the aluminum deposited substrate by absorption of water was 0.9 deg. Further, the substrate also showed a water absorption of 0.160 wt % and a flexural modulus of 2,950 MPa.

Example 26

(Polymerization)

4,050 parts of colorless powder having a molar ratio of BCF/BPA/THPE of 20:80:0.5 was obtained in the same manner as in Example 24 except that 24 parts of 1,1,1-tris (4-hydroxyphenyl)ethane (hereinafter may be abbreviated as "THPE") was added after blowing of phosgene and the amount of p-t-butyl phenol was changed to 104 parts. This powder had a specific viscosity of 0.285 and a Tg of 173° C.

(Molding)

To this powder, the same additives as used in Example 24 were added in the same amounts as used in Example 24, and the resulting mixture was melt-kneaded and pelletized in the same manner as in Example 24. Then, this pellet was injection molded in the same manner as in Example 24 so as to obtain a substrate. The substrate had a sufficiently smooth surface so as to be used for a plastic mirror.

On the substrate, aluminum was deposited. The maximum warpage of the aluminum deposited substrate by absorption of water was 0.9 deg. Further, the substrate also showed a water absorption of 0.160 wt % and a flexural modulus of 2,720 MPa.

Example 27

(Polymerization)

5,300 parts of colorless powder having a molar ratio of BCF/BPA of 70:30 was obtained in the same manner as in Example 24 except that 4,112 parts of BCF, 1,063 parts of BPA and 84 parts of p-t-butyl phenol were used. This powder had a specific viscosity of 0.261 and a Tg of 210° C.

(Molding)

To this powder, the same additives as used in Example 24 were added in the same amounts as used in Example 24, and the resulting mixture was melt-kneaded and pelletized in the same manner as in Example 24 except that the cylinder temperature was 320° C. Then, this pellet was injection molded in the same manner as in Example 24 so as to obtain a substrate. The substrate had a sufficiently smooth surface so as to be used for a plastic mirror.

On the substrate, aluminum was deposited. The maximum warpage of the aluminum deposited substrate by absorption of water was 0.9 deg. Further, the substrate also showed a water absorption of 0.150 wt % and a flexural modulus of 3,200 MPa.

Comparative Example 10

(Polymerization)

3,670 parts of colorless polymer was obtained in the same manner as in Example 24 except that only 3,543 parts of BPA was used as a dihydroxy component and 140 parts of p-t-butyl phenol was used. This powder had a specific viscosity of 0.290 and a Tg of 142° C.

(Molding)

To this powder, the same additives as used in Example 24 were added in the same amounts as used in Example 24, and the resulting mixture was melt-kneaded and pelletized in the same manner as in Example 24. Then, this pellet was injection molded in the same manner as in Example 24 so as to obtain a substrate. The substrate had a sufficiently smooth surface so as to be used for a plastic mirror. Then, on the substrate, aluminum was deposited. The maximum warpage of the aluminum deposited substrate by absorption of water was 1.4 deg. Further, the substrate also showed a high water absorption of 0.21 wt % and a low flexural modulus of 2,350 MPa.

Comparative Example 11

(Polymerization)

3,650 parts of colorless polymer was obtained in the same manner as in Example 24 except that only 3,542 parts of BPA was used as a dihydroxy component and 140 parts of p-t-butyl phenol was used. This powder has a specific viscosity of 0.289 and a Tg of 142° C.

(Molding)

To this powder, the same additives as used in Example 24 were added in the same amounts as used in Example 24, and the resulting mixture was melt-kneaded and pelletized in the same manner as in Example 24. Further, to this resin, 1,188 parts of glass fibers having a fiber diameter of 13 microns of Nippon Electric Glass Co., Ltd. were added. After they were mixed uniformly by a tumbler, the mixture was melt-kneaded at 240° C. by a vented twin screw extruder (KTX-46 of Kobe Steel, Ltd.) while being deaerated so as to obtain a pellet. Then, a disk substrate having a diameter of 120 mm and a thickness of 1.2 mm was injection molded from the pellet by use of M35B-D-DM of MEIKI CO., LTD. Further, on the substrate, aluminum was deposited to a film thickness of 50 nm by use of the EKC-1 Ion Plating apparatus of Sumitomo Heavy Industries, Ltd. Although the aluminum deposited substrate showed a significantly improved rigidity of 6,330 MPa, some of the glass fibers appeared on the surface of the substrate, thereby making the substrate impossible to use as a mirror. Further, the aluminum deposited substrate showed a water absorption of 0.13 wt % and a maximum warpage by absorption of water of 0.1 deg.

The results of these Examples and Comparative Examples are shown in Table 6.

(Polygon Mirror)

Further, the pellets obtained in the above Examples 24 to 27 and Comparative Examples 10 and 11 were dried at 120° C. for 5 hours. Then, hexahedral mirror type polygon mirror substrates each having a distance between the center and each mirror surface of 25 mm, a minimum plate thickness in each mirror portion of 5 mm and a height of the mirror portion of 15 mm were molded by use of an injection molding machine (SG150U of Sumitomo Heavy Industries, Ltd.) at a cylinder temperature of 340° C. and a mold temperature of 115° C. The results of evaluations of the mold printabilities of the polygon mirrors are shown in Table 6.

Then, on these substrates, an Al film was deposited to a thickness of 80 nm so as to prepare polygon mirrors. Comparative Example 11 could not be used as a mirror since it had poor surface properties. Comparative Example 10 had an insufficient flexural modulus, and distortions in mirror portions by rotations were severe. Examples 24 to 27 had good surface properties, had small distortions in mirror portions due to high flexural moduli and were therefore sufficiently practicable.

(Molding)

To this powder, 0.003 parts of tris(2,4-di-t-butylpyhenyl) phosphite, 0.00.5 parts of trimethyl phosphate and 0.045 parts of monoglyceride stearate were added based on 100 parts of the powder.

Then, the powder was melt-kneaded by use of a vented twin screw extruder (KTX-46 of Kobe Steel, Ltd.) at a cylinder temperature of 240° C. while being deaerated, pelletized, and then injection molded into a disk substrate having a diameter of 120 mm and a thickness of 1.2 mm by use of M35B-D-DM of MEIKI CO., LTD. The substrate had a sufficiently smooth surface so as to be used for a plastic mirror.

Further, on the substrate, aluminum was deposited to a thickness of 50 nm by use of the EKC-1 Ion Plating apparatus of Sumitomo Heavy Industries, Ltd. The maximum warpage of the aluminum deposited substrate by absorption of water was 0.4 deg. Further, the substrate

TABLE 6

| Item | | Ex. 24 | Ex. 25 | Ex. 26 | Ex. 27 | C. Ex. 10 | C. Ex. 11 |
|---|---|---|---|---|---|---|---|
| BCF | Component a | 20 | 50 | 20 | 70 | — | — |
| BPA | Component b | 80 | 50 | 80 | 30 | 100 | 100 |
| THPE | | — | — | 0.5 | — | — | — |
| Glass Fibers | | — | — | — | — | 25 | — |
| Specific Viscosity | | — | 0.285 | 0.278 | 0.285 | 0.261 | 0.290 | 0.289 |
| Glass Transition Temperature | (° C.) | 172 | 195 | 173 | 210 | 142 | 142 |
| Flexural Modulus | (MPa) | 2,700 | 2,950 | 2,720 | 3,200 | 2,350 | 6,330 |
| Water Absorption | wt % | 0.170 | 0.160 | 0.160 | 0.150 | 0.210 | 0.130 |
| Cylinder Temperature | (° C.) | 320 | 340 | 320 | 350 | 280 | 280 |
| Mold Tightening Force | (ton) | 65 | 65 | 65 | 65 | 65 | 65 |
| Mold Temperature | (° C.) | 100 | 130 | 100 | 130 | 100 | 100 |
| Maximum Warpage by Absorption of Water | (deg) | 0.9 | 0.9 | 0.9 | 0.9 | 1.4 | 0.1 |
| Surface Roughness  Disk | nm | 40 | 50 | 45 | 51 | 30 | 600 |
| Surface Roughness  Polygon Mirror Substrate | nm | 38 | 50 | 48 | 45 | 32 | 570 |

Ex.: Example,
C. Ex.: Comparative Example

Example 28

(Polymerization)

To a reactor equipped with a thermometer, agitator, reflux condenser and phosgene blowing tube, 32,165 parts of ion exchange water and 1,757 parts of sodium hydroxide were added, and 2,213 parts of 9,9-bis(3-methyl-4-hydroxyphenyl)fluorene (hereinafter may be abbreviated as "BCF"), 3,039 parts of 4,4'-(m-phenylenediisopropylidene)diphenol (hereinafter may be abbreviated as "BPM") and 11 parts of hydrosulfite were dissolved. Then, after 10,950 parts of methylene chloride was added, 1,667 parts of phosgene was blown into the mixture at 16 to 18° C. in 60 minutes under agitation. After completion of the blowing of phosgene, 92 parts of p-t-butyl phenol and 293 parts of sodium hydroxide were added, 4 parts of triethylamine was further added, and the resulting mixture was agitated at 30° C. for 1 hour, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. Thereby, 5,554 parts of colorless powder having a molar ratio of BCF/BPM of 40:60 was obtained. This powder had a specific viscosity of 0.285 and a Tg of 144° C.

showed an MVR of 34 g/10 min, a water absorption of 0.083 wt % and a flexural modulus of 3,260 MPa.

Example 29

(Polymerization)

5,224 parts of colorless powder having a molar ratio of BCF/BPM of 50:50 was obtained in the same manner as in Example 28 except that 2,596 parts of BCF and 2,377 parts of BPM were used. This powder had a specific viscosity of 0.269 and a Tg of 155° C.

(Molding)

To this powder, the same additives as used in Example 28 were added in the same amounts as used in Example 28, and the resulting mixture was melt-kneaded and pelletized in the same manner as in Example 28. Then, this pellet was injection molded in the same manner as in Example 28 so as to obtain a substrate. The substrate had a sufficiently smooth surface so as to be used for a plastic mirror. Then, on the substrate, aluminum was deposited. The maximum warpage of the aluminum deposited substrate by absorption of water was 0.4 deg. Further, the substrate showed an MVR of 26 g/10 min, a water absorption of 0.080 wt % and a flexural modulus of 3,330 MPa.

Example 30

(Polymerization)

5,245 parts of colorless powder having a molar ratio of BCF/BPM/THPE of 40:60:0.5 was obtained in the same manner as in Example 28 except that 21 parts of 1,1,1,-tris (4-hydroxxyphenyl)ethane (hereinafter may be abbreviated as "THPE") was further added after blowing of phosgene and the amount of p-t-butyl phenol was changed to 113 parts. This powder had a specific viscosity of 0.288 and a Tg of 143° C.

(Molding)

To this powder, the same additives as used in Example 28 were added in the same amounts as used in Example 28, and the resulting mixture was melt-kneaded and pelletized in the same manner as in Example 28. Then, this pellet was injection molded in the same manner as in Example 28 so as to obtain a substrate. The substrate had a sufficiently smooth surface so as to be used for a plastic mirror. Then, on the substrate, aluminum was deposited. The maximum warpage of the aluminum deposited substrate by absorption of water was 0.4 deg. Further, the substrate showed an MVR of 36 g/10 min, a water absorption of 0.083 wt % and a flexural modulus of 3,280 MPa.

Example 31

(Polymerization)

5,460 parts of colorless powder having a molar ratio of BCF/BPM of 65:35 was obtained in the same manner as in Example 28 except that 3,598 parts of BCF and 1,773 parts of BPM were used. This powder had a specific viscosity of 0.264 and a Tg of 175° C.

(Molding)

To this powder, the same additives as used in Example 28 were added in the same amounts as used in Example 28, and the resulting mixture was melt-kneaded and pelletized in the same manner as in Example 28 except that the cylinder temperature was 280° C. Then, this pellet was injection molded in the same manner as in Example 28 so as to obtain a substrate. The substrate had a sufficiently smooth surface so as to be used for a plastic mirror. Then, on the substrate, aluminum was deposited. The maximum warpage of the aluminum deposited substrate by absorption of water was 0.5 deg. Further, the substrate showed an MVR of 26 g/10 min, a water absorption of 0.080 wt % and a flexural modulus of 3,330 MPa.

Comparative Example 12

(Polymerization)

4,750 parts of colorless polymer was obtained in the same manner as in Example 28 except that only 4,320 parts of bisphenol A was used as a dihydroxy component. This powder had a specific viscosity of 0.289 and a Tg of 142° C.

(Molding)

To this powder, the same additives as used in Example 28 were added in the same amounts as used in Example 28, and the resulting mixture was melt-kneaded and pelletized in the same manner as in Example 28. Then, this pellet was injection molded in the same manner as in Example 28 so as to obtain a substrate. The substrate had a sufficiently smooth surface so as to be used for a plastic mirror. Then, on the substrate, aluminum was deposited. The maximum warpage of the aluminum deposited substrate by absorption of water was as large as 1.4 deg. Further, the substrate showed an MVR of 69 g/10 min, a high water absorption of 0.21 wt % and a low flexural modulus of 2,350 MPa.

Comparative Example 13

(Polymerization)

4,750 parts of colorless polymer was obtained in the same manner as in Example 28 except that only 4,320 parts of bisphenol A was used as a dihydroxy component. This powder had a specific viscosity of 0.286 and a Tg of 142° C.

(Molding)

To this powder, the same additives as used in Example 28 were added in the same amounts as used in Example 28, and the resulting mixture was melt-kneaded and pelletized in the same manner as in Example 28. Further, to this resin, 1,188 parts of glass fibers having a fiber diameter of 13 microns of Nippon Electric Glass Co., Ltd. were added. After they were mixed uniformly by a tumbler, the mixture was melt-kneaded at 240° C. by a vented twin screw extruder (KTX-46 of Kobe Steel, Ltd.) while being deaerated so as to obtain a pellet. Then, a disk substrate having a diameter of 120 mm and a thickness of 1.2 mm was injection molded from the pellet by use of M35B-D-DM of MEIKI CO., LTD. Further, on the substrate, aluminum was deposited to a film thickness of 50 nm by use of the EKC-1 Ion Plating apparatus of Sumitomo Heavy Industries, Ltd. Although the aluminum deposited substrate showed a significantly improved rigidity of 6,330 MPa, some of the glass fibers appeared on the surface of the substrate, thereby making the substrate impossible to use as a mirror. Further, the aluminum deposited substrate showed an MVR of 64 g/10 min, a water absorption of 0.13 wt % and a maximum warpage by absorption of water of 0.1 deg.

The results of these Examples and Comparative Examples are shown in Table 7.

(Polygon Mirror)

Further, the pellets obtained in the above Examples 28 to 31 and Comparative Examples 12 and 13 were dried at 120° C. for 5 hours. Then, hexahedral mirror type polygon mirror substrates each having a distance between the center and each mirror surface of 25 mm, a minimum plate thickness in each mirror portion of 5 mm and a height of the mirror portion of 15 mm were molded by use of an injection molding machine (SG150U of Sumitomo Heavy Industries, Ltd.) at a cylinder temperature of 300° C. and a mold temperature of 100° C. The results of evaluations of the mold printabilities of the polygon mirrors are shown in Table 7.

Then, on these substrates, an Al film was deposited to a thickness of 80 nm so as to prepare polygon mirrors. Comparative Example 12 could not be used as a mirror since it had poor surface properties. Comparative Example 12 had an insufficient flexural modulus, and distortions in mirror portions by rotations were severe. Examples 28 to 31 had good surface properties, had small distortions in mirror portions due to high flexural moduli and were therefore sufficiently practicable.

TABLE 7

| Item | | Ex. 28 | Ex. 29 | Ex. 30 | Ex. 31 | C. Ex. 12 | C. Ex. 13 |
|---|---|---|---|---|---|---|---|
| BCF | Component a | 40 | 50 | 40 | 65 | — | — |
| BPM | Component b | 60 | 50 | 60 | 35 | — | — |
| BPA | | — | — | — | — | 100 | 100 |
| THPE | | — | — | 0.5 | — | — | — |
| Glass Fibers | | — | — | — | — | — | 25 |
| Specific Viscosity | | 0.285 | 0.269 | 0.288 | 0.264 | 0.289 | 0.286 |
| Glass Transition Temperature | (° C.) | 144 | 155 | 143 | 175 | 142 | 142 |
| Flexural Modulus | (MPa) | 3,260 | 3,330 | 3,280 | 3,520 | 2,350 | 6,330 |
| Water Absorption | wt % | 0.083 | 0.080 | 0.083 | 0.079 | 0.210 | 0.130 |
| MVR | cm$^3$ | 34 | 26 | 36 | 9 | 69 | 64 |
| Cylinder Temperature | (° C.) | 280 | 280 | 280 | 320 | 280 | 280 |
| Mold Tightening Force | (ton) | 65 | 65 | 65 | 65 | 65 | 65 |
| Mold Temperature | (° C.) | 100 | 100 | 100 | 120 | 100 | 100 |
| Maximum Warpage by Absorption of Water | (deg) | 0.4 | 0.4 | 0.4 | 0.5 | 1.4 | 0.1 |
| Surface Roughness Disk | nm | 30 | 35 | 35 | 34 | 30 | 600 |
| Surface Roughness Polygon Mirror Substrate | nm | 32 | 34 | 36 | 35 | 32 | 570 |

Ex.: Example,
C. Ex.: Comparative Example

Examples 32 to 36 and Comparative Examples 14 and 15

Conductive Resin Composition

Physical properties were evaluated by the following methods.

(1) Specific Viscosity

This is measured at a temperature of 20° C. after 0.7 g of polymer is dissolved in 100 ml of methylene chloride.

(2) Glass Transition Point (Tg)

This is measured at a temperature increasing rate of 20° C./min by use of the 2910 type DSC of TA INSTRUMENTS JAPAN CO., LTD.

(3) Heat Resistance

A deflection temperature under a load of 18.5 kg is measured in accordance with ASTM D648.

(4) Electric Conductivity

A surface resistivity value is measured in accordance with ASTM D257.

(5) Water Absorption

Water absorption after immersed in water at 23° C. for 24 hours is measured in accordance with ASTM D-0570.

(6) Irritation

A polymer which causes irritation to skin is evaluated as "x" and a polymer which causes no irritation to skin is evaluated as "◯" during formation of molded pieces to be measured by the following methods.

(7) Heat Cycle Test

A injection molded carrying tray having a size of 153 mm×142 mm×165 mm and a groove pitch of 4.76 mm and capable of holding 25 5-inch disks is subjected to 10 cycles each of which comprises 20 hours at 150° C. and 4 hours at 23° C., and the occurrence of distortion in the molded article was observed.

(Polymerization)

PC1

To a reactor equipped with a thermometer, agitator and reflux condenser, 21,538 parts of ion exchange water and 4,229 parts of 48% sodium hydroxide aqueous solution were added, and 1,949 parts of bisphenol A, 3,231 parts of biscresolfluorene and 10.9 parts of hydrosulfite were dissolved. Then, after 14,530 parts of methylene chloride was added, 2,200 parts of phosgene was blown into the mixture at 16 to 20° C. in 60 minutes under agitation. After completion of the blowing of phosgene, 115.4 parts of p-t-butyl phenol and 705 parts of 48% sodium hydroxide aqueous solution were added, 2.6 parts of triethylamine was further added, and the resulting mixture was agitated at 20 to 27° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. As a result, 5,520 parts of whitish yellow polymer having a molar ratio of bisphenol A/biscresolfluorene of 50:50, a specific viscosity of 0.272 and a Tg of 197° C. was obtained (yield: 96%).

To this polycarbonate copolymer, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the resulting mixture was extruded by an extruder at a cylinder temperature of 300° C. so as to obtain a polycarbonate copolymer pellet (PC1).

PC2

To a reactor equipped with a thermometer, agitator and reflux condenser, 19,580 parts of ion exchange water and 3,845 parts of 48% sodium hydroxide aqueous solution were added, and 2,835 parts of bisphenol A, 1,175 parts of biscresolfluorene and 8.4 parts of hydrosulfite were dissolved. Then, after 13,209 parts of methylene chloride was added, 2,000 parts of phosgene was blown into the mixture at 18 to 20° C. in 60 minutes under agitation. After completion of the blowing of phosgene, 93.2 parts of p-t-butyl phenol and 641 parts of 48% sodium hydroxide aqueous solution were added, 2.0 parts of triethylamine was further added, and the resulting mixture was agitated at 20 to 27° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. As a result, 4,230 parts of whitish yellow polymer having a molar ratio of bisphenol A/biscresolfluorene of 80:20, a specific viscosity of 0.374 and a Tg of 173° C. was obtained (yield: 94%).

To this polycarbonate copolymer, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the resulting mixture was extruded by an extruder at a cylinder temperature of 280° C. so as to obtain a polycarbonate copolymer pellet (PC2).

To a reactor equipped with a thermometer, agitator and reflux condenser, 20,980 parts of ion exchange water and 1,523 parts of potassium hydroxide were added, and 886 parts of bisphenol A, 1,360 parts of 9,9-bis(4-hydroxyphenyl)fluorene (hereinafter referred to as "bisphenolfluorene") and 4.7 parts of hydrosulfite were dissolved. Then, after 13,210 parts of methylene chloride was added, 1,000 parts of phosgene was blown into the mixture at 18 to 20° C. in 60 minutes under agitation. After completion of the blowing of phosgene, 52.4 parts of p-t-butyl phenol and 218 parts of potassium hydroxide were added, 2.7 parts of triethylamine was further added, and the resulting mixture was agitated at 20 to 27° C. for 40 minutes, thereby completing the reaction.

After completion of the reaction, the obtained product was diluted with methylene chloride, washed with water, made acidic by hydrochloric acid and then washed with water. When the electric conductivity of the water phase became nearly the same as that of ion exchange water, methylene chloride was evaporated by a kneader. As a result, 2,250 parts of whitish yellow polymer having a molar ratio of bisphenol A/bisphenolfluorene of 50:50, a specific viscosity of 0.272 and a Tg of 205° C. was obtained (yield: 90%).

To this polycarbonate copolymer, 0.050% of tris(2,4-di-t-butylphenyl)phosphite, 0.010% of octadecyl-3-(3,5-di-t-butyl-4-hydroxyphenyl)propionate and 0.030% of pentaerythritol tetrastearate were added, and the resulting mixture was extruded by an extruder at a cylinder temperature of 300° C. so as to obtain a polycarbonate copolymer pellet (C-PC1).

C-PC2

3,870 parts of whitish yellow polymer having a molar ratio of bisphenol A/biscresolfluorene of 9.9:1, a specific viscosity of 0.390 and a Tg of 148° C. was obtained (yield: 95%) in the same manner as in production of PC1 except that 3,907 parts of bisphenol A and 59 parts of biscresolfluorene were used. An aromatic polycarbonate resin pellet (C-PC2) was obtained from the polymer in the same manner as in the production of PC1.

(Carbon Based Filler)

Carbon Fiber: BESFIGHT HTA-C6-U of TOHO RAYON CO., LTD., PAN based, epoxy converged, fiber diameter of 7 microns Carbon Black: ketjenblack EC600JD of Lion Corporation (hereinafter referred to as "CB")

Examples 32 to 36 and Comparative Examples 14 and 15

(Molding)

The above obtained PC1 and PC2, C-PC1 or C-PC2, and components shown in Tables 8 and 9 were mixed uniformly by use of a tumbler and then pelletized by use of a φ30-mm vented twin screw extruder (KTX-30 of Kobe Steel, Ltd.) at a cylinder temperature of 300° C. and a degree of vacuum of 10 mmHg while being deaerated. The obtained pellets were dried at 120° C. for 5 hours, and molded pieces to be measured were then prepared by use of an injection molding machine (SG150U of Sumitomo Heavy Industries, Ltd.) at a cylinder temperature of 330° C. and a mold temperature of 100° C. The results of evaluations are shown in Tables 8 and 9.

(Carrying Tray)

Further, after pellets prepared in the same manner as described above were dried at 120° C. for 5 hours, carrying trays each having a size of 153 mm×142 mm×165 mm and a groove pitch of 4.76 mm and capable of holding 25 5-inch disks were injection molded at a cylinder temperature of 350° C. and a mold temperature of 100° C. The results of heat cycle tests are shown in Tables 8 and 9.

It is obvious from comparisons among the above Examples and Comparative Examples that aromatic polycarbonate resin compositions comprising the polycarbonate copolymers of the present invention and the carbon fibers have better heat resistance and conductivity than the compositions of Comparative Examples using the aromatic polycarbonate resins and cause no irritation to skin.

TABLE 8

| | | | Unit | Ex. 32 | Ex. 33 | Ex. 34 | Ex. 35 | Ex. 36 |
|---|---|---|---|---|---|---|---|---|
| Compositions | Polycarbonate Resins | PC1 | Parts by Weight | 100 | | 100 | 100 | 100 |
| | | PC2 | Parts by Weight | | 100 | | | |
| | Carbon Based Fillers | Carbon Fibers | Parts by Weight | 20 | 20 | 12 | | 10 |
| | | CB | Parts by Weight | | | | 10 | 1 |
| Evaluations | Deflection Temperature under Load | | ° C. | 192 | 171 | 191 | 186 | 189 |
| | Conductivity | | Ω | $10^4$ | $10^4$ | $10^5$ | $10^3$ | $10^3$ |
| | Water Absorption | | % by Weight | 0.16 | 0.18 | 0.17 | 0.18 | 0.17 |
| | Irritation | | — | ◯ | ◯ | ◯ | ◯ | ◯ |
| | Heat Cycle Test | | — | Good | Good | Good | Good | Good |

Ex.: Example

TABLE 9

| | | | Unit | C. Ex. 14 | C. Ex. 15 |
|---|---|---|---|---|---|
| Compositions | Polycarbonate Resins | PC1 | Parts by Weight | | |
| | | PC2 | Parts by Weight | | |
| | | C-PC1 | Parts by Weight | 100 | |
| | | C-PC2 | Parts by Weight | | 100 |
| | Carbon Based Fillers | Carbon Fibers | Parts by Weight | 20 | 20 |
| | | CB | Parts by Weight | | |

TABLE 9-continued

| | | Unit | C. Ex. 14 | C. Ex. 15 |
|---|---|---|---|---|
| Evaluations | Deflection Temperature under Load | °C. | 195 | 147 |
| | Conductivity | Ω | $10^4$ | $10^4$ |
| | Water Absorption | % by Weight | 0.26 | 0.20 |
| | Irritation | — | X | ○ |

C. Ex.: Comparative Example

According to the present invention, there is provided a polycarbonate copolymer having excellent heat resistance and dimensional stability and low water absorption and causing no irritation to skin. Further, according to the present invention, heat resistant parts comprising the copolymer and suitable for various applications are provided.

The part for reflow soldering of the present invention has excellent transparency and heat resistance and undergoes no deformation even after treated in a reflow furnace showing a peak temperature of 250° C. Thus, it can be used as a part to be incorporated into a substrate by reflow soldering, e.g., a camera lens of a camera-incorporated mobile telephone.

The light path converting part of the present invention has good heat resistance and thermal stability, a very little birefringence and excellent transparency. Thus, it is suitable for use as a pickup lens, a camera lens, a microarray lens, a projector lens or a prism.

The optical disk of the present invention has excellent rigidity, damping, heat resistance and water absorbability and is suitable for use as a recording medium having a high density recording capacity.

The plastic mirror of the present invention has high rigidity and excellent dimensional stability and mold printability at the time of molding. Thus, it is suitable for use as a polygon mirror, a projector mirror or the like.

The conductive resin composition of the present invention has an advantage that it has good heat resistance, excellent conductivity and low water absorption and causes no irritation to skin. Thus, it is suitable for use as a carrying tray for electronic parts such as a semiconductor, an optical data recording medium or a hard disk.

POSSIBILITY OF INDUSTRIAL UTILIZATION

The polycarbonate copolymer of the present invention can be applied to optical components requiring heat resistance, transparency and dimensional stability, e.g., lenses, prisms, optical disks and plastic mirrors. In addition, it can also be used in a production process of electronic parts, e.g., as a carrying tray for the electronic parts.

The invention claimed is:

1. A part for reflow soldering, the part comprising a polycarbonate copolymer, the polycarbonate copolymer comprising 60 to 95 mol % of recurring unit (component a) represented by the following general formula (I):

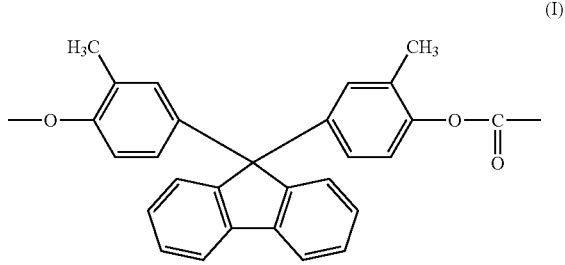

(I)

and 40 to 5 mol % of recurring unit (component b) represented by the following general formula (II-1).

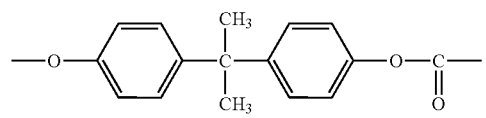

(II-1)

2. The part of claim 1, wherein the polycarbonate copolymer comprises 70 to 85 mol % of the recurring unit represented by the general formula (I) and 30 to 15 mol % of the recurring unit represented by the general formula (II-1).

3. The part of claim 1, wherein the polycarbonate copolymer shows a specific viscosity of 0.17 to 0.55 which is measured at 20° C., dissolving 0.7 g of the copolymer in 100 ml of methylene chloride.

4. The part of claim 1, wherein the polycarbonate copolymer shows a glass transition temperature (Tg) of 200 to 250° C. which is measured at a temperature increasing rate of 20° C./min.

5. The part of claim 1, which is a lens, lens barrel or prism.

6. A light path converting part comprising a polycarbonate copolymer, the polycarbonate copolymer comprising 5 to 95 mol % of recurring unit (component a) represented by the following general formula (I):

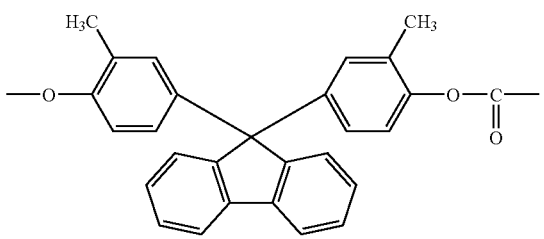

(I)

and 50 to 5 mol % of recurring unit (component b) represented by the following general formula (II):

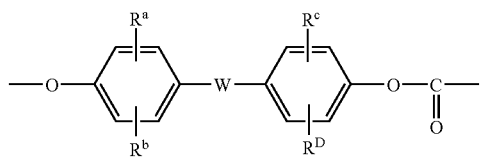

(II)

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, SO$_2$, CO or COO group).

7. The part of claim 6, wherein the polycarbonate copolymer comprises 50 to 95 mol % of the recurring unit represented by the general formula (I) and 50 to 5 mol % of the recurring unit represented by the general formula (II).

8. The part of claim 6, wherein the polycarbonate copolymer comprises 5 to 95 mol % of recurring unit (component a) represented by the following general formula (I):

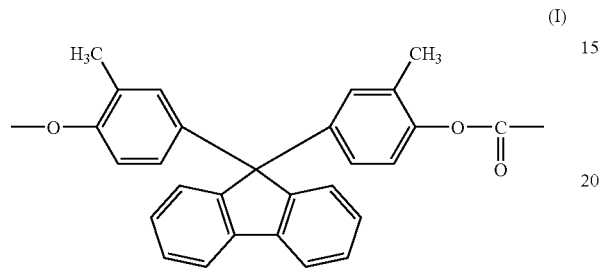

(I)

and 95 to 5 mol % of recurring unit (component b) represented by the following general formula (II-1) and/or (II-2).

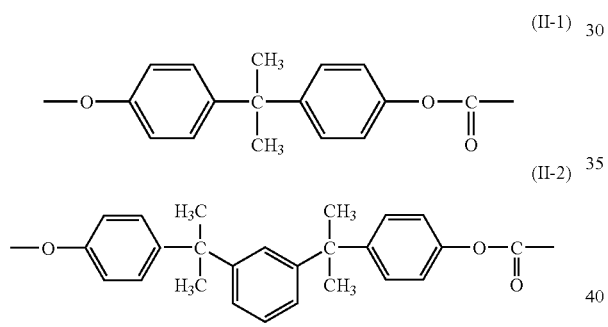

9. The part of claim 6, wherein the polycarbonate copolymer shows a transmittance at 550 nm of 80% or higher as a molded plate and satisfies the following expression:

$$Re_{550}/d \leq 10$$

when retardation at 550 nm is Re$_{550}$ (nm) and the thickness of a portion where the transmittance and the retardation are measured is d (mm).

10. The part of claim 6, which is a pickup lens, camera lens, microarray lens, projector lens or prism.

11. An optical disk that comprises a substrate with a thickness of 0.3 to 1.2 mm which has embossed pits or guide grooves, a reflective layer formed on the substrate and a transparent protective layer with a thickness of 3 to 200 µm which is formed on the reflective layer and that reproduces recorded data based on a change in the light intensity of reflected light produced by irradiating the disk with a light beam from the transparent protective layer side, the substrate substantially comprising a polycarbonate copolymer, the polycarbonate copolymer comprising 20 to 95 mol % of recurring unit (component a) represented by the following general formula (I):

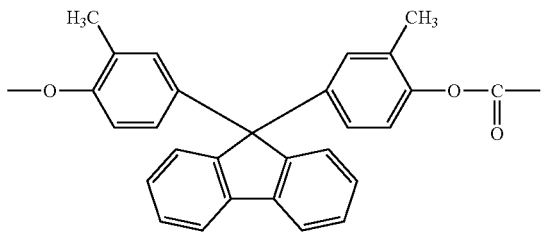

(I)

and 80 to 5 mol % of recurring unit (component b) represented by the following general formula (II):

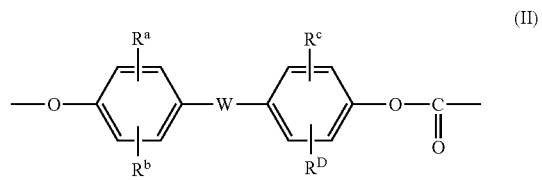

(II)

(wherein R$^a$ to R$^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, SO$_2$, CO or COO group), the substrate showing:

(A) a flexural modulus of 2,800 to 4,000 MPa, (B) a water absorption of 0.3 wt % or lower upon reaching saturation, (C) a tan δ measured at 40° C. and 18 Hz in accordance with ISO 6721-4 of at least 0.020, and (D) a deflection temperature under load measured under a load of 1.81 MPa in accordance with ISO 75-1, -2 of 110° C. or higher.

12. The disk of claim 11, wherein the polycarbonate copolymer comprises 25 to 70 mol % of the recurring unit (component a) represented by the general formula (I) and 75 to 30 mol % of the recurring unit (component b) represented by the general formula (II).

13. The disk of claim 11, wherein the polycarbonate copolymer comprises 20 to 95 mol % of recurring unit (component a) represented by the following general formula (I):

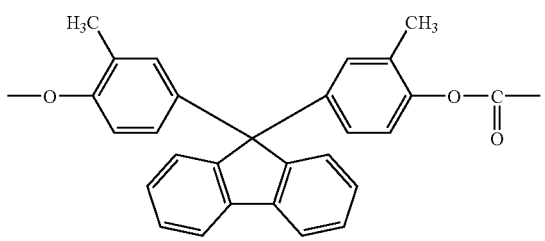

(I)

and 80 to 5 mol % of recurring unit (component b) represented by the following general formula (II-2) and/or (II-3).

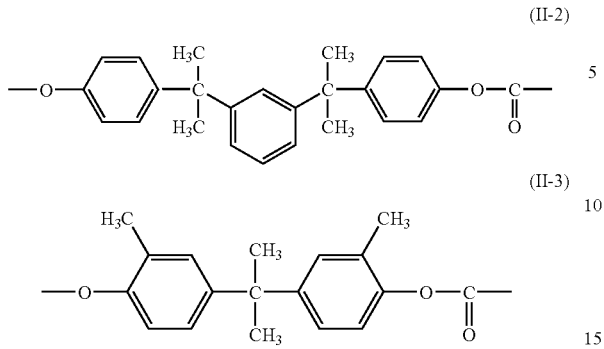

14. The disk of claim 11, which has a recording layer between the reflective layer and the transparent protective layer.

15. The disk of claim 11, wherein the embossed pits or the guide grooves are formed on both surfaces of the substrate, and the reflective layer, the recording layer and/or the transparent protective layer are/is also formed on both surfaces thereof.

16. The disk of claim 11, which has a multilayer structure that the recording layer or the reflective layer is laminated multiple times.

17. The disk of claim 11, wherein the polycarbonate copolymer shows a specific viscosity measured at 20° C. of 0.1 to 0.5 when 0.7 g of the copolymer is dissolved in 100 ml of methylene chloride.

18. The disk of claim 11, wherein the transparent protective layer is composed of the same polycarbonate copolymer as that constituting the substrate.

19. A plastic mirror which is a polygon mirror or projector mirror comprising a polycarbonate substrate and a metallic reflective film,
the polycarbonate substrate comprising a polycarbonate copolymer,
the polycarbonate copolymer comprising 20 to 70 mol % of recurring unit (component a) represented by the following general formula (I):

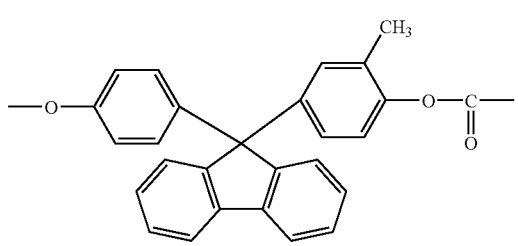

and 80 to 30 mol % of recurring unit (component b) represented by the following general formula (II-1) and/or (II-2):

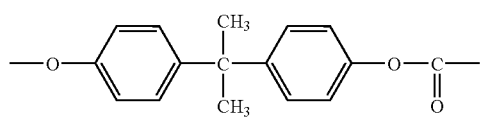

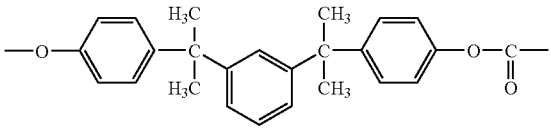

the polycarbonate substrate showing:
(A) a glass transition temperature of 120 to 230° C.,
(B) a water absorption of 0.2 wt % or lower after immersed in water at 23° C. for 24 hours, and
(C) a flexural modulus of 2,500 to 4,000 MPa.

20. The mirror of claim 19, wherein the molar ratio of the component a to the component b is 30:70 to 60:40.

21. The mirror of claim 19, wherein the polycarbonate copolymer comprises 20 to 70 mol % of the recurring unit (component a) represented by the general formula (I) and 80 to 30 mol % of the recurring unit (component b) represented by the general formula (II-1), and the polycarbonate substrate shows the following properties, i.e.,
(A) a glass transition temperature of 160 to 230° C.,
(B) a water absorption of 0.2 wt % or lower after immersed in water at 23° C. for 24 hours, and
(C) a flexural modulus of 2,500 to 3,500 MPa.

22. The mirror of claim 19, wherein the polycarbonate copolymer comprises 20 to 70 mol % of the recurring unit (component a) represented by the general formula (I) and 80 to 30 mol % of the recurring unit (component b) represented by the general formula (II-2), and the polycarbonate substrate shows the following properties, i.e.,
(A) a glass transition temperature of 120 to 180° C.,
(B) a water absorption of 0.1 wt % or lower after immersed in water at 23° C. for 24 hours, and
(C) a flexural modulus of 2,800 to 4,000 MPa.

23. The mirror of claim 19, wherein the polycarbonate copolymer shows a specific viscosity measured at 20° C. of 0.1 to 0.5 when 0.7 g of the copolymer is dissolved in 100 ml of methylene chloride.

24. The mirror of claim 19, wherein the polycarbonate copolymer shows an amount flown out in 10 minutes at 300° C. and 1.2 kgf in an MVR measurement of not smaller than 5 cm$^3$.

25. The mirror of claim 19, which has a spherical, non-spherical, flat or polyhedral shape.

26. A conductive resin composition comprising a polycarbonate copolymer and a carbon based filler, the polycarbonate copolymer comprising 5 to 95 mol % of recurring unit (component a) represented by the following general formula (I):

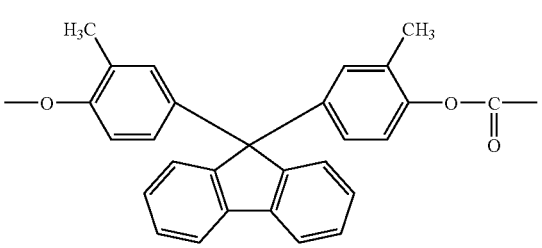

and 95 to 5 mol % of recurring unit (component b) represented by the following general formula (II):

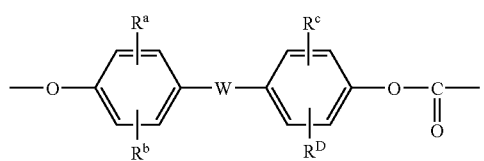

(wherein $R^a$ to $R^d$ are each independently a hydrogen atom, a hydrocarbon group which may contain an aromatic group having 1 to 9 carbon atoms or a halogen atom, and W is a single bond, a hydrocarbon group which may contain an aromatic group having 1 to 20 carbon atoms or an O, S, SO, $SO_2$, CO or COO group).

27. The composition of claim 26, which comprises 40 to 99 wt % of the polycarbonate copolymer and 60 to 1 wt % of the carbon based filler.

28. The composition of claim 26, wherein the polycarbonate copolymer comprises 5 to 95 mol % of recurring unit (component a) represented by the following general formula (I):

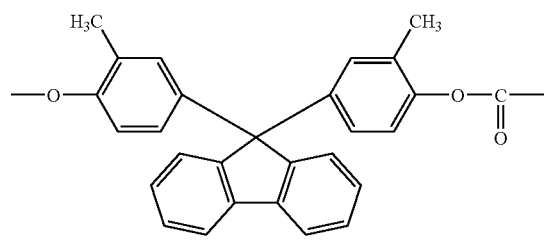

and 95 to 5 mol % of recurring unit (component b) represented by the following general formula (II-1).

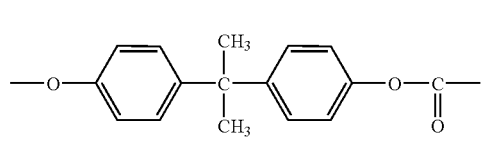

29. A tray for conveying an electronic part, the tray comprising the composition of claim 26.

30. The tray of claim 29, wherein the electronic part is a semiconductor, an optical data recording medium or a hard disk.

31. The part of claim 6, wherein the polycarbonate copolymer comprises 50 to 70 mol % of the recurring unit represented by the general formula (I) and 50 to 30 mol % of the recurring unit represented by the general formula (II).

32. The part of claim 6, wherein the polycarbonate copolymer comprises 5 to 35 mol % of recurring unit (component a) represented by the following general formula (I):

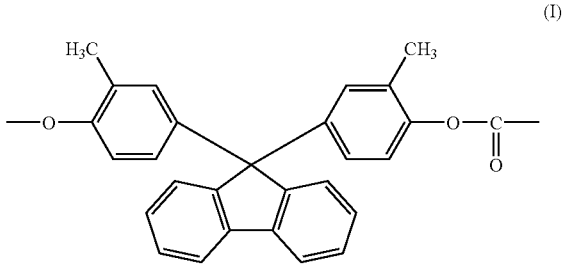

and 95 to 5 mol % of recurring unit (component b) represented by the following general formula (II-1).

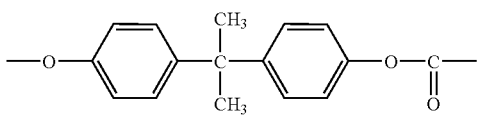

33. The part of claim 6, wherein the copolymer comprises 5 to 95 mol % of recurring unit (component a) represented by the following general formula (I):

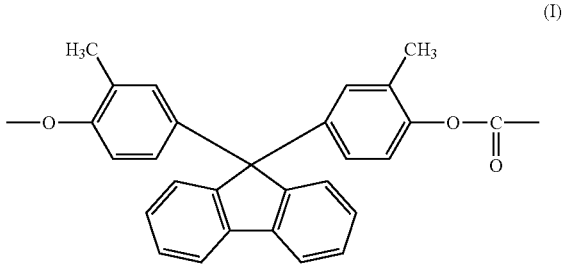

and 95 to 5 mol % of recurring unit (component b) represented by the following general formula (II-1) and/or (II-2)

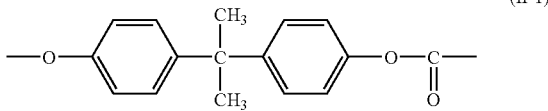

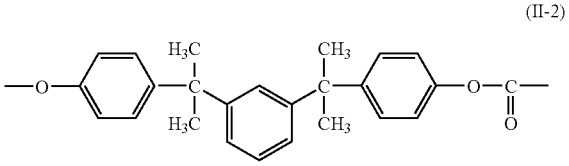

* * * * *